US006032132A

United States Patent [19]

Nelson

[11] Patent Number: 6,032,132

[45] Date of Patent: Feb. 29, 2000

[54] TELECOMMUNICATIONS ACCESS COST MANAGEMENT SYSTEM

[75] Inventor: Nickolas B. Nelson, Englewood, Colo.

[73] Assignee: CSG Systems, Inc., Englewood, Colo.

[21] Appl. No.: 09/097,136

[22] Filed: Jun. 12, 1998

[51] Int. Cl.[7] ........ G06F 17/60

[52] U.S. Cl. ........ 705/34

[58] Field of Search ........ 705/34, 27; 455/406

[56] References Cited

U.S. PATENT DOCUMENTS

| | | | |
|---|---|---|---|
| 4,713,761 | 12/1987 | Sharpe et al. | 364/406 |
| 5,148,474 | 9/1992 | Haralambopoulos et al. | 379/111 |
| 5,287,270 | 2/1994 | Hardy et al. | 364/408 |
| 5,325,290 | 6/1994 | Cauffman et al. | 364/401 |
| 5,598,459 | 1/1997 | Haartsen | 379/58 |
| 5,684,965 | 11/1997 | Pickering | 395/234 |
| 5,699,416 | 12/1997 | Atkins | 379/127 |
| 5,699,528 | 12/1997 | Hogan | 395/240 |
| 5,832,460 | 11/1998 | Bednar et al. | 705/27 |

OTHER PUBLICATIONS

Unknown. Avista Corp.'s Internet Affiliate, Avista Advantage, Adds Maintenacne and Repair Bill Servic to Industry Leading Products. PR Newswire. p. 470, Mar. 8, 1999.

Unknown. Avista Advantange. http://www.wwpco.com/about/advantage.html.

Weart, Wally. A Middle Road for Rate Management Software. Distribution. vol. 88, No. 11, pp. 94–96, Nov. 1989.

Moynihan, James. Cutting Utility Costs Using EDI. Healthcare Financial Management. vol. 52, No. 3, p. 78, Mar. 1998.

Carter, Kim. PCs can Tap Databanks for Costs. Modern Healthcare. vol. 16, No. 13, p. 52, Jun. 20, 1986.

Heinz, Steven. Energy–Account Software Unlocks Savings Potential of Deregulation. Chain Store Age. vol. 73, No. 9, p. 182, Sep. 1997.

Freaney, Margie. Health Refrom Leaves Industry Breathless. Baltimore Business Journal. vol. 11, No. 30, p. 2, Dec. 1993.

*Primary Examiner*—Emanuel Todd Voeltz
*Assistant Examiner*—M. David Sofocleous
*Attorney, Agent, or Firm*—Holme Roberts & Owen, LLP

[57] ABSTRACT

A Telecom Access Cost Management System provides the capability for a communication carrier service provider to substantially automate the payment to other communication carrier service providers for the use of their services and equipment. Billed charges are received in a variety of forms from the communication carrier service providers. The cost processor receives this information, checks its integrity, and converts it to a format in which it can be further processed. Once this information has been uploaded and converted, a validation process is performed in which the individual items of the bill are checked as to whether the rate information charged by the communication carrier service providers matches the rates which have been either negotiated or established by a third party. Any discrepancies noted in this comparison process are included in a report that is included with the item in the billed charges. The user of the system can then review the billed charges in conjunction with any discrepancy amounts that have been noted. An automated payment module then provides for the generation of an electronic file for transmittal to Accounts Payable for payment to the communication carrier service provider who has provided the service and also provides any dispute reports that may then be later negotiated between the parties.

36 Claims, 40 Drawing Sheets

114

TELECOMMUNICATIONS ACCESS COST MANAGEMENT SYSTEM

FIELD OF THE INVENTION

The present invention relates generally to billing systems, and more particularly, to a system for verifying charges, verifying the availability of equipment, and verifying the performance of services between communication carrier service providers.

BACKGROUND OF THE INVENTION

The provision of communication services to businesses and individuals often entails the transmission of voice, image and other data via the use of communication devices maintained by different communication carrier service providers. While the provision of such communication services may be adapted to appear "seamless" to users, e.g., via consolidated billing by a single carrier to its customer, the underlying cross-carrier services are in fact billed between the cooperating service providers on a periodic basis.

By way of primary example, multiple telecommunication carriers may be utilized to complete a given long distance call between two remote locations. The call may be initiated by a caller via interface with the caller's local telephony carrier service provider, transferred for interstate transmission to a long distance service provider, and further transferred to a local telephony service provider for the called party. In such an arrangement, while the caller's local telephony carrier service provider will bill the caller for charges associated with the call, the long distance service provider and called party local telephony carrier may bill the caller's local telephony service provider. The amount charged between various communication carrier service providers may be as per regulated rates and/or agreed upon contract rates, and may further depend upon a variety of other considerations (e.g., volume of communications between carriers, time-of-day of communications between carriers, degree of special access between carriers, bandwidth allocated for communications, etc.).

As will be appreciated, given the ever-increasing volume of communications involving multiple carriers the complexity of the services provided, and the increasing number of communications providers, the management of cross-carrier billings can be a formidable task. Concomitantly, the validation, payment, and analysis of such cross billings can be burdensome, particularly in view of highly labor-intensive techniques currently employed to provide such functionality.

SUMMARY OF THE INVENTION

Described herein is a system for the management of billed charges and services between communication carrier service providers. The system contemplates an arrangement in which a first communication carrier service provider is billed for services by a second communication carrier service provider, the billed charges most typically received in a first digital file format. Of importance, the billed charges include a plurality of entries that have corresponding billed charge rate components. In one aspect of the invention, when the first carrier receives the billed charges, corresponding reference charge rates are automatically retrieved from a database maintained or otherwise readily accessed by the first carrier. The billed charge rates and the reference charge rates are then automatically compared in order to determine if a discrepancy exists therebetween.

The system described herein may include a graphical user interface (GUI) which includes a processor which can access data (e.g., billed changes) from a plurality of different types of storage media and which comprises such data in accordance with preprogrammed instructions and/or in accordance with inputs to the GUI. In conjunction with accessing the billed charges, the billed charges may be initially uploaded from the received storage media to an upload module in the processor. Once the information has been uploaded, a variety of analyses may be performed.

In one arrangement, an integrity check is performed on the billing charges received electronically to confirm that no corrupted data has been transmitted. A duplicate billing check is also performed to be sure that the billing charges received are not duplicates of charges previously received and loaded into the production database. The GUI may access the database through a data network. After these checks have been performed and the incoming billed charges have been parsed, a conversion process may be performed in order to convert the bill data into a second digital file format which can be processed internally by the system (e.g., via relational database management techniques). A report may also be generated documenting the upload and conversion of the billing information. Upon satisfactory completion of the data upload/conversion process, the electronic bill is loaded into a production database.

Once in the database, a validation process may be performed to check a number of components of the bill, including the actual charged rates against reference charge rates for calls (minutes of use and mileage), the presence or absence of equipment (network components, circuits, switches, telephony hardware, etc.), the appropriate delivery of services (including timeliness and location), and charges for re-occurring and non-reoccurring services. Charge rates may be negotiated between the parties (contract rates) or such rates as were previously established by regulatory agencies (local public utility commissions or the Federal Communications Commission). The billing information is retrieved from the production database and comparisons are made between what the second service provider charged versus what the first service provider has identified as the appropriate charge or rate. At this point, any discrepancies between the actual charged rate and the reference rate are recorded in the production database and the record found to have potential discrepancies is book marked.

The discrepancy information that was generated in the validation process may then be used in a dispute management process. For example, for billing information with respect to which a discrepancy is noted, a dispute may be generated which includes the discrepancy amount and the apparent reason for the discrepancy. The system user may also update, amend or resolve any dispute amounts that have been previously generated for billed charges.

After completion of the validation process, a system user may be provided the opportunity to either approve or disapprove a billed charge through a bill review and approval process. At this point, the billing information is displayed on a user interface for a system user. The system user may access any information relevant to the billing information, including any outstanding disputes and related information for the billing information currently displayed. The system user may either approve payment for the bill or may reject the bill for return to the validation process. If the bill is disapproved, the system user can insert notes in the billing information as to why it was rejected. If the system user approves any or all of the billing information in the bill review and approval module, the approved amount of the currently displayed bill is then available for payment.

Once billed charges have been approved for payment, a payment process can be triggered to pay a bill. In the case where a disputed amount has been indicated for a bill, the short pay amount may be paid to the vendor, and the disputed amount otherwise reported to the vendor for review and disposition. Once a disputed amount is resolved, the status of this amount may be changed in the dispute management module, either manually by a system user, or electronically, utilizing electronic information transmitted in subsequent billing for the specific account in dispute.

A number of additional processing modules are provided for tracking information related to vendors, accounts, contracts, inventory, and billing rates. Other modules exist for performing various administrative tasks such as generating reports. A system user may access and operate the various processing modules through screen displays presented on the graphical user interface.

Numerous additional aspects and advantages of the present invention will become apparent to those skilled in the art.

DETAILED DESCRIPTION

The access cost management system, as described herein, substantially automates the bill processing by a customer for charges made by a vendor for use of its' equipment or services. The embodiments described herein refer to the billing procedures for telephony services, however one skilled in the art would realize that the system described herein may have applications that extend beyond this particular area of business and technology. As is well known, there are many different communication service providers that provide telephony services for individuals and businesses. These providers may not own all the communication lines that are used in order to provide their services. For example, a long-distance phone carrier in most cases does not own the local phone lines but, instead, must obtain access to these lines through a vendor. Agreements are established between the long-distance carriers and the local phone companies for use of particular lines. Periodically, the vendor will send the customer a bill that includes charges for use of its lines. The system described herein substantially automates the processing and payment process for these billed charges.

Figure 1:
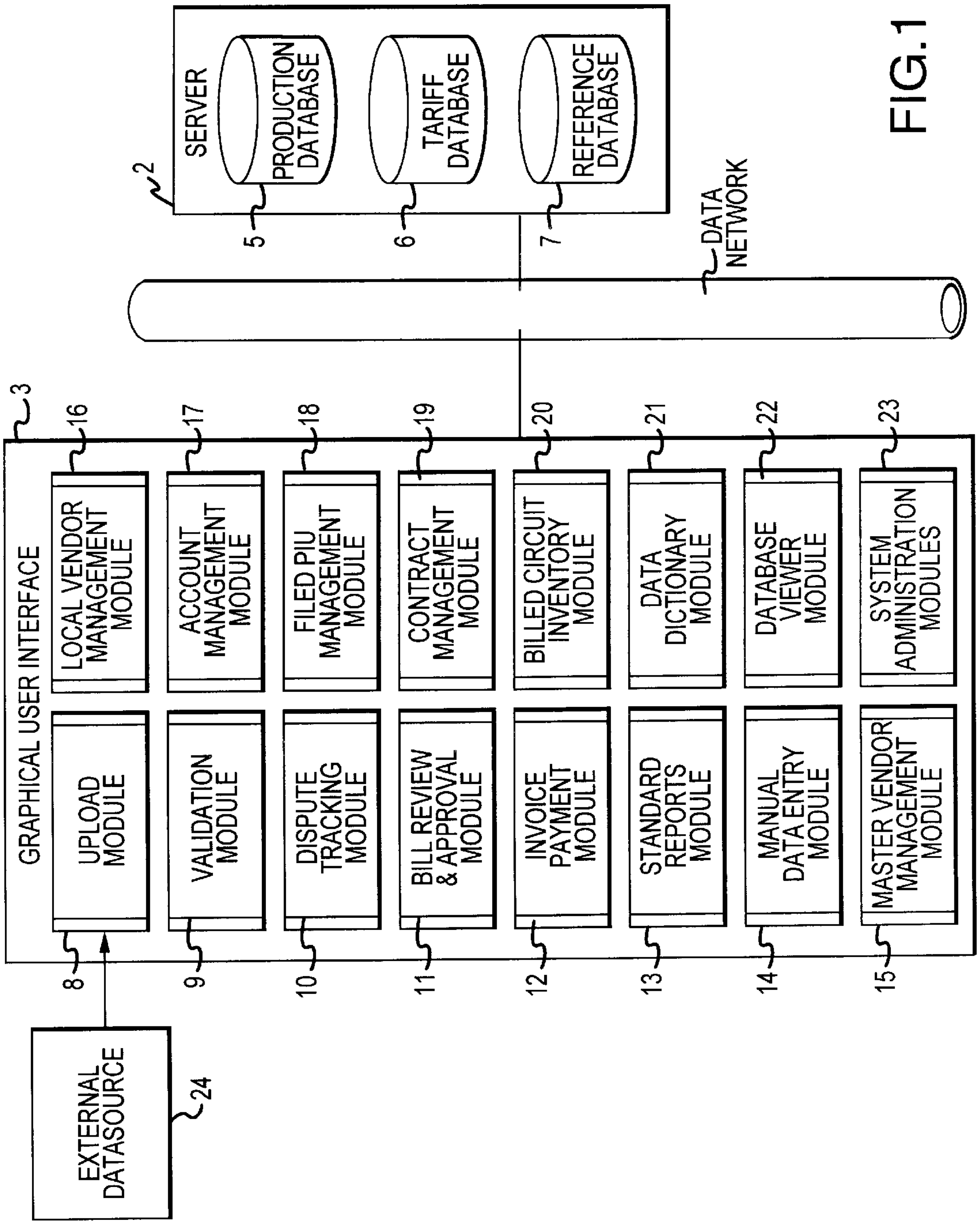
FIG. 1 discloses a system diagram for an access cost management system that shows internal and external connections to a cost management server, database system, and graphical user interface.

Disclosed in FIG. 1 is a system diagram for the access cost management system which shows in particular the internal and external connections for processor 2 and graphical user interface 3. The processor 2 may be implemented as a UNIX or NT server that may establishes connections over a data network 1 with remotely located processing devices. The data network 1 may be the Internet, an intranet, or any type of node based computer system. Included on the server is production database 5. This database is relational in nature, containing multiple tables that are accessible and searchable by the system user through an ODBC (Open Database Connectivity) connection over the data network 1. This database may be implemented in a number of relational formats that may include Oracle, Sybase, or any other relational database software. Also stored in relational database format is the tariff database 6, containing rate and tariff information for use in validating billed charges, and reference database 7 which contains a variety of reference and descriptive information that may be used by other components of the system to perform analysis on the billed charges as well as provide clarifying information for report output.

Also shown in FIG. 1 is graphical user interface (GUI) 3. In one embodiment of the invention the GUI is a personal or other stand-alone computer which may operate in the NT or Windows 95 environment. The GUI includes the capability to display information, allow the system user to initiate commands, and provide for the manual input of data. The system diagram in FIG. 1 shows a single GUI for explanation purposes only. The access cost management system described herein may incorporate multiple implementations of the GUI. Within the GUI are upload module 8, validation module 9, dispute management module 10, bill review and approval module 11, bill payment module 12, standard reports module 13, manual data entry module 14, master vendor management module 15, local vendor management module 16, account management module 17, filed PIU management module 18, contract management module 19, billed circuit inventory module 20, data dictionary module 21, database viewer module 22, and additional system administration modules (system user management, Centrex switch inventory, AP code management) 23. These elements will be discussed in greater detail below.

The upload module 8 provides the function of uploading the billed charges from external data source 24. The external data source 24 shown in FIG. 1 represents the submission of the billed charges by the vendor to the customer. The vendors may submit the billed charges through a variety of means. Some examples are CD-Rom's, diskettes, 9-track tape, cartridge tape, and electronic file transfer. The information on these different media may be in a number of different formats. Some examples of possible data formats are CABS, CENTREX, AEBS, CRIS, as well as any custom formatted carrier electronic bill data. In addition, the upload module performs a variety of data analysis functions on the uploaded information, and converts the information from whatever format it is received in to a relational database format. Once this conversion is complete, the billed charges are stored in the production database 5.

Figure 2:
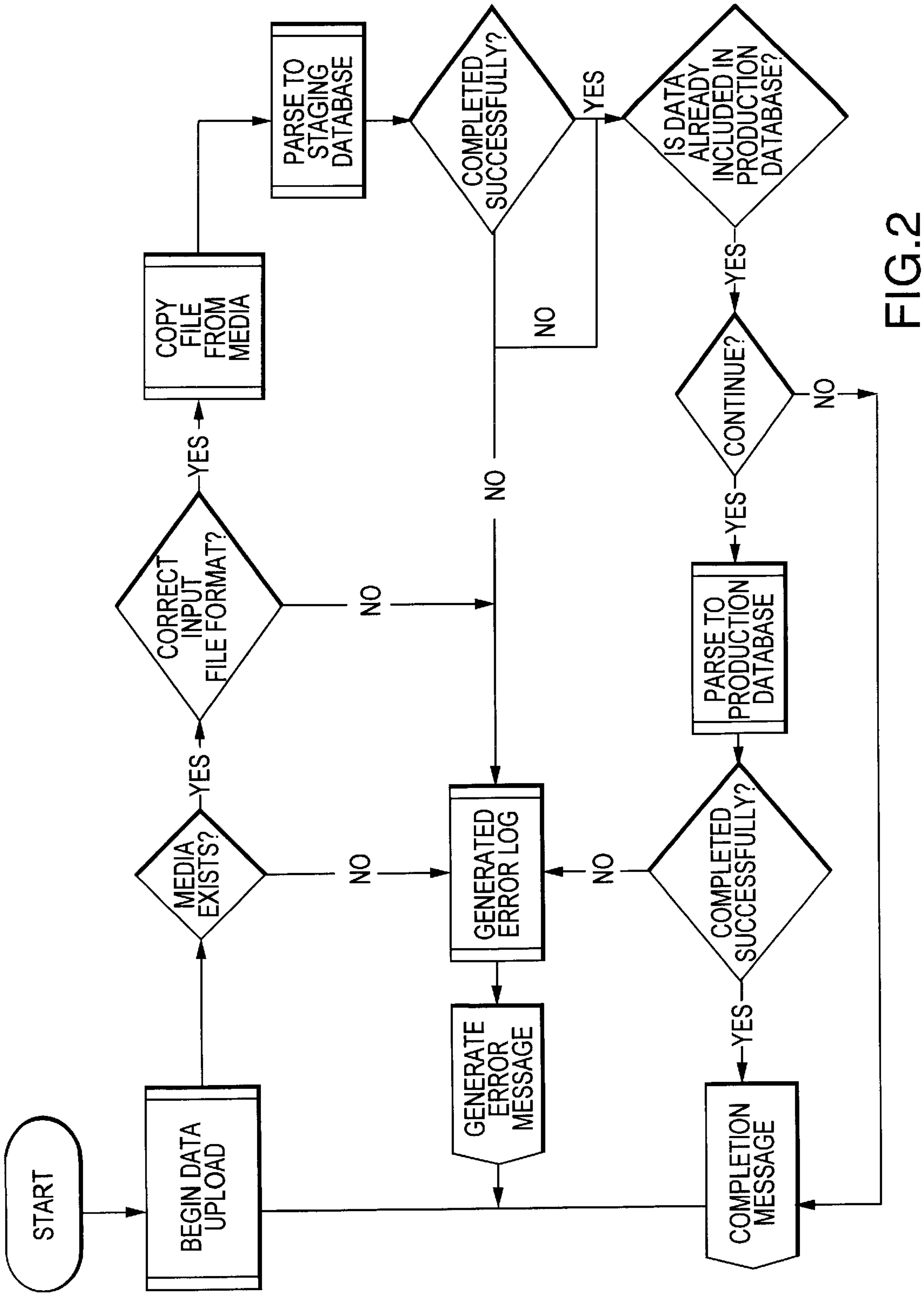
FIG. 2 discloses a flow chart that describes the operation of the upload module.
Figure 3:
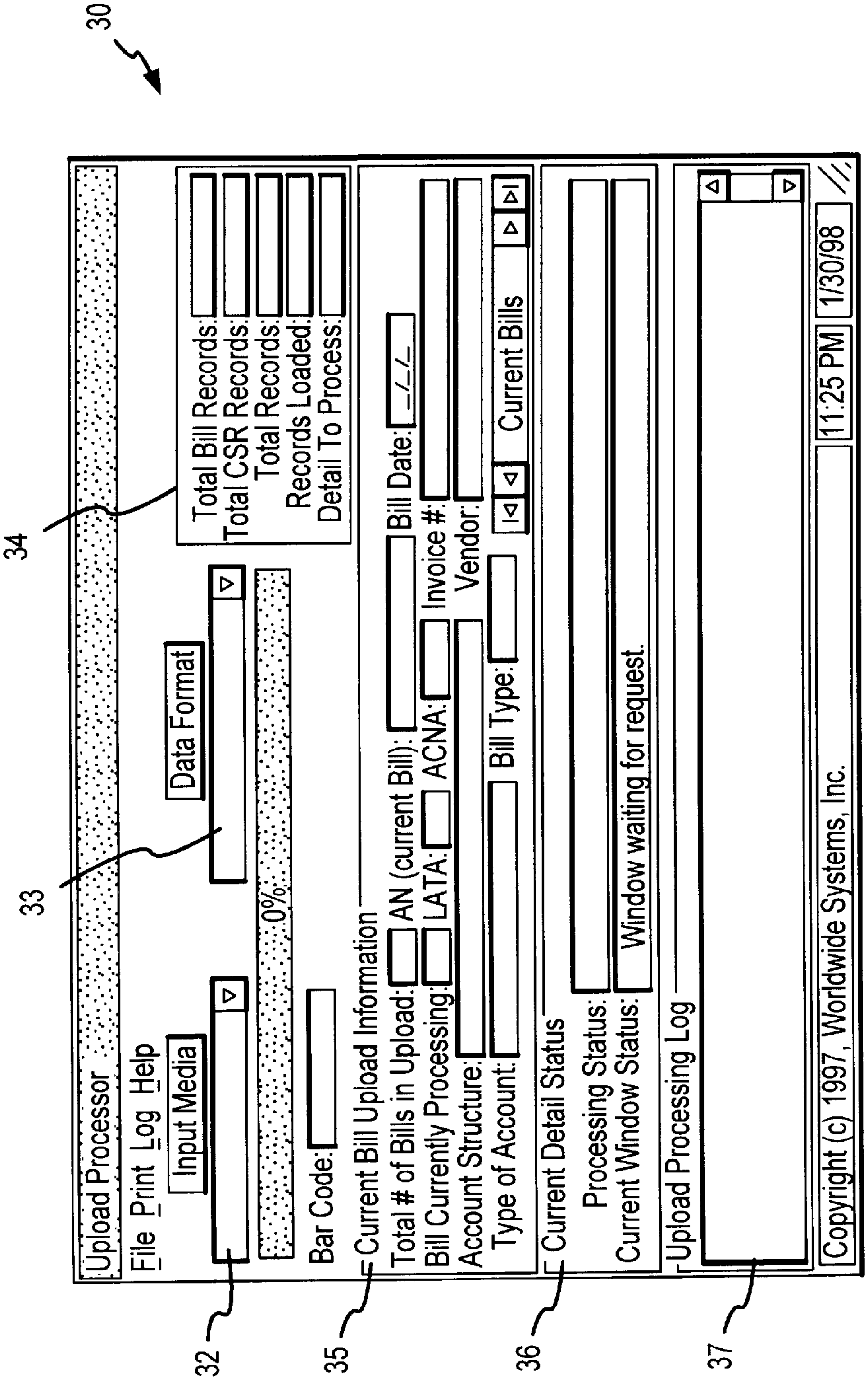
FIG. 3 discloses a screen display that may be utilized by a system user to initiate the upload process.

Disclosed in FIG. 2 is a flow chart which describes the data upload process. The data upload process may be initiated in one of two ways; either in an unattended process started by the Server 2, or by a system user through the GUI. FIG. 3 discloses a screen display 30 that may be used by a system user to initiate and manage the upload process. The system user may select from a list of input media types 32 and file formats 33 to begin uploading data. To begin the process, the upload module verifies that the media exists and that the file contained on the media is in the correct (and readable) format. The data file is immediately transferred from the media to a temporary file located in the database system 4 in order to begin the data conversion and parsing process. The temporary file is transferred, record by record, to a staging database, during which time, the file and associated records are examined to ensure that all the records anticipated based upon the file type have been received, that the records are formatted correctly, and that the records occur in the correct order. As was described above, the vendors may store their billed charges in a particular electronic format which the processor, and more specifically, the input module needs to translate in order to store the information in the production database. If the information format is not recognizable, the process is aborted and an error log for this step is generated. The particular file format appropriate for the bill or bills being loaded may include a specific version or release number, indicating differences between releases of the format that the processor must take into consideration during the upload process.

Upon completion of the transfer to the staging database, information specific to the bill or bills that were contained on the original media are displayed in boxes 34 and 35 of screen display 30, as well as a written in visual log 37 of the status of the upload process. At this point the system user has the opportunity to review the information displayed. If the bill or bills contained on the original media already exist in the production database 5, the appropriate error log entries are generated, the system user is notified, and upload processing is terminated. If the bill or bills do not currently exist in the production database 5, the system user may then continue the upload process by issuing a command to parse the staging database data into the production database. Each data format has its own header information which the input module translates and uses to properly parse the information.

During that parsing process, the upload processor displays parsing activity continuously on the upload screen 30 for the system user, including, but not limited to, the number and type of records currently being processed 34, the current processing status and screen status 36, and the completion log entries 37 of each section of the upload process. If fatal errors were detected during the parsing of data into the staging database, the system user can print a report of the upload log including any errors detected, and return the report with the defective media or data file to the originating vendor, in order to obtain a corrected bill. Alternatively, the system user may elect to discontinue the upload process for the bill or bills currently in the staging database and reload the information at a later date.

During the upload process, a number of other activities may take place to ensure the integrity of the data and its effective use later in the access cost management process. When an electronic bill is submitted to the upload processor for a vendor that is not currently in the master vendor file in the reference database, the upload processor will prompt the system user to enter the name of the vendor submitting the bill. The name entered by the system user, along with the OCN (operating company number) for that vendor, retrieved from the electronic bill, is written to the master vendor file in the reference database, and an exception record is written to an exception table in the production database 5, for review by a system administrator. All unique external and internal circuit ID pairs occurring on circuit records received on electronic bills are written to the billed circuit inventory table contained in the reference database 7, for review and planning as well as line cost management through the billed circuit inventory module 20 to ensure that the services and circuits indicated are appropriate, have been implemented in a timely manner, at the appropriate location, and with the appropriate charges. FID (field identification code) information, associated with CSR (customer service record) activity in certain electronic bills and received in unparsed blocks of data, is parsed and written to special tables, for use in standard reporting 13, as well as in cost and service delivery and utilization analysis. The upload module records all information pertinent to the load (time, duration, number of records) in a load log associating that data to the billed charges being loaded in order to track the receipt of vendor bills.

The Validation module 9 retrieves billed charges that have been loaded into the production database and performs a variety of processes. These processes include a check on the validity of the vendor making the charge, the detection of any discrepancies in the billed charges received when compared against reference information in the reference database, the calculation of any discrepancy amounts and the writing of a discrepancy record to the production database for use in the dispute and payment approval process.

The basic function of the validation module is to perform comparisons between the billed charges and tariff, contract, circuit or other charge and rate information previously stored in the tariff or reference database. This charge and rate information includes such things as charges and rates agreed to by the parties for use of circuits, products, or services as well as any charges established by local public utilities commissions or the Federal Communications Commission.

Figure 4:
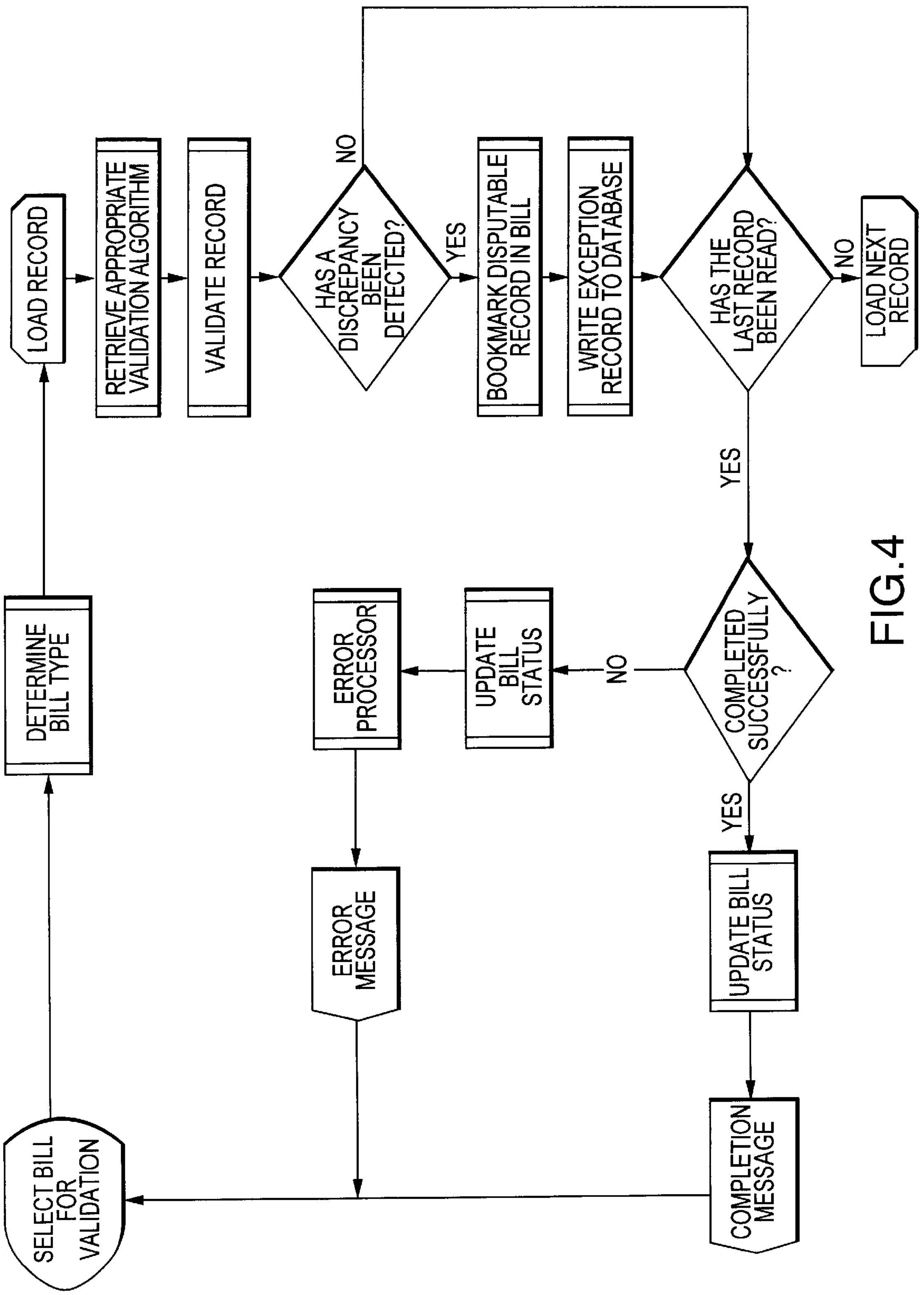
FIG. 4 discloses a flow chart that describes the operation of the validation module.
Figure 5:
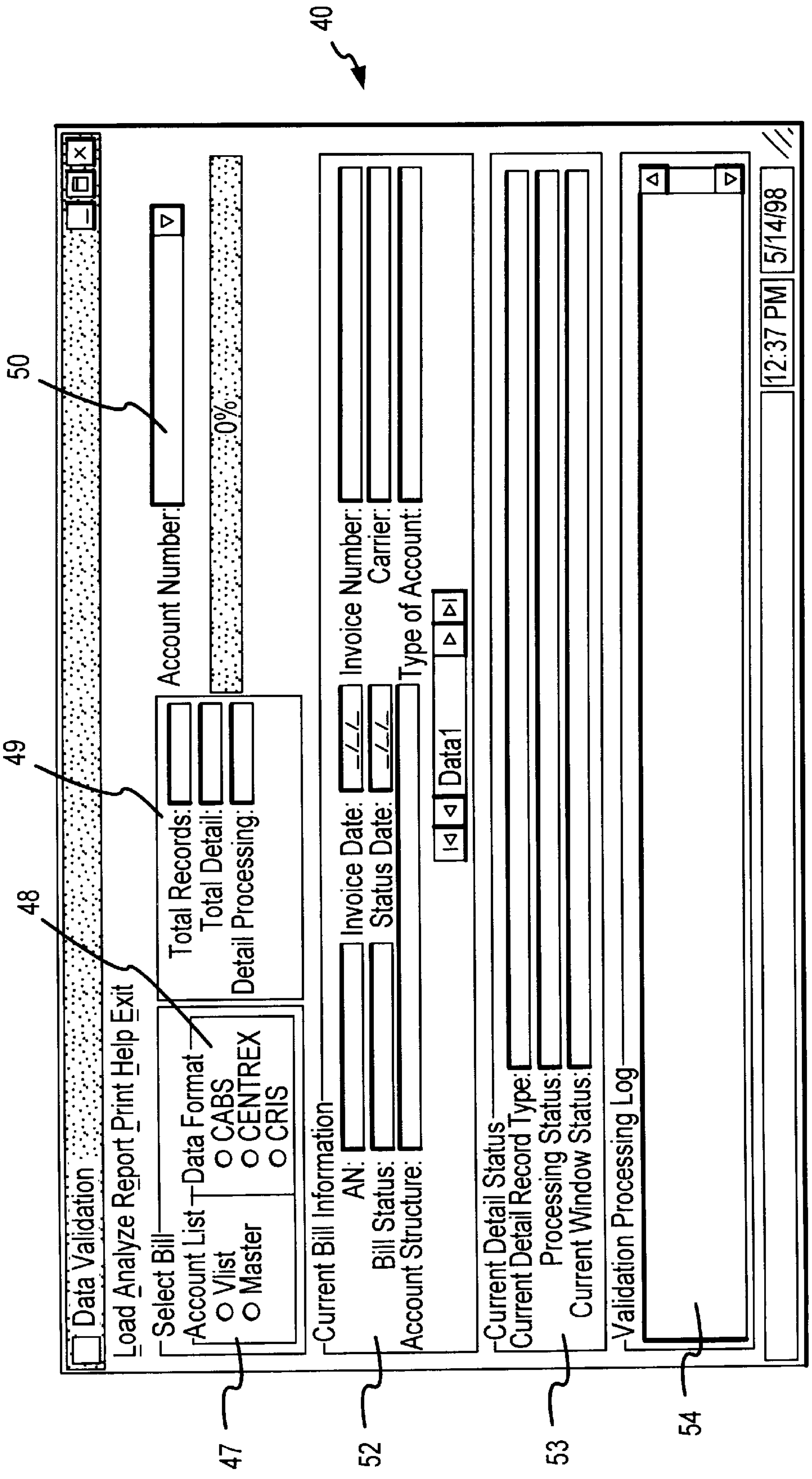
FIG. 5 discloses a screen display that may be utilized by a system user to initiate and manage the validation process.

The processes performed by the validation module are described in detail in the flowchart disclosed in FIG. 4. FIG. 5 shows a screen display 40 that may be used by a system user to initiate and manage the validation process. On the screen, the system user may select from an account list 47 (either a V List-bills that have not been validated yet or Master-bills that have already been validated at least once) and/or data format 48 to retrieve a list of bills 50 (by account number) for validation. Upon selection of an account by the system user, the validation module accesses the production database and uploads the billed charges which have been selected by the system user. After the billed charges have been uploaded, the type of bill (CSR, usage, circuit, switched or special, etc.) is determined. After the bill type has been determined, the first record appropriate for validation for that bill, stored in the production database is loaded and information specific to the bill to be validated is displayed for the system user to view in block 52. As the bill is processed, status information is displayed in block 53, and a processing log is created and displayed in block 54 (and printed if desired, by the system user). After the record is loaded, the validation algorithm appropriate for that record type is retrieved 40. Depending on the type of record, the validation algorithm may retrieve tariff charges, rates, time-of-day, banding, zone, mileage, local calling area, circuit, contract term, USOC (uniform service order code), and/or filed PIU information from the tariff 6 and reference 7 databases to determine if the charges or services represented in the record are correct. If through use of the validation algorithm discrepancies are discovered between service or charge information on the record vs. service or charge information either calculated or stored in the tariff and reference databases, that particular record is book-marked, and an exception record containing the account number, bill date, the unique bookmark number, and exception description is written to the production database. The summary record for the bill being validated is also flagged, to indicate that exceptions have occurred in detail records contained in the bill. When reviewing a bill for dispute management, for review and approval, and for payment, the disputed records and associated exception records are automatically retrieved for review and further processing by the system. The validation process continues for each appropriate record in the bill. If, after processing the last record, no exceptions were disclosed, the bill status is updated and the validation process is complete for that bill. If the validation process fails for whatever reason, the error is logged and an error message is generated.

Any discrepancies detected in the validation module are further processed in the dispute management module 10. The dispute management module 10 provides the capability to create, package, and manage disputes. It allows the system user to select bills containing exception records resulting from the validation process, and then includes those various details in a formal dispute. That dispute then becomes an entity within the system, which can be tracked, reviewed, and finally closed after resolution with the vendor with whom the dispute is being pursued. The dispute is linked to the specific bill records from which it was created, and is viewable from other modules in the processor.

Figure 6:
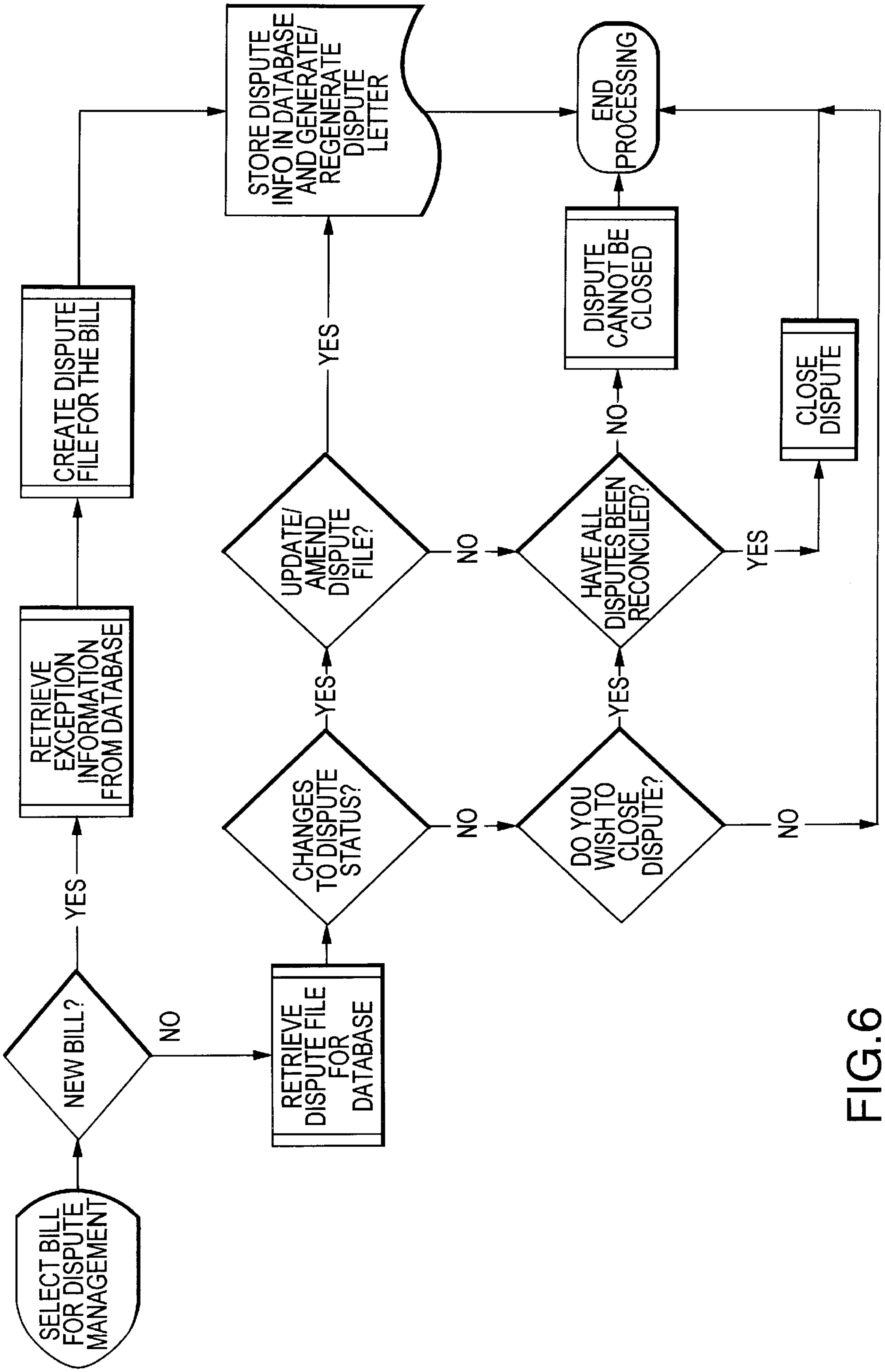
FIG. 6 discloses a flow chart that describes the operation of the dispute management module.
Figure 7:
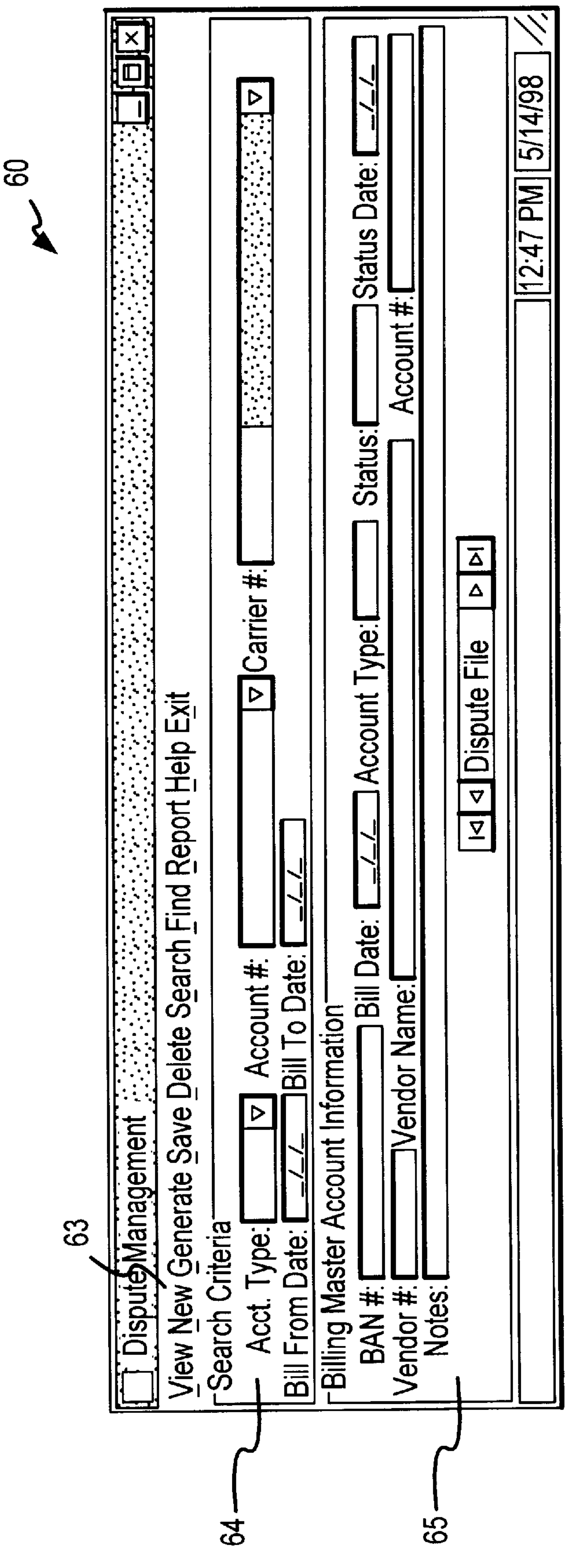
FIG. 7 discloses a screen display that may be utilized by a system user to initiate and manage the dispute process.

FIG. 6 discloses a flowchart which describes in detail the steps performed by the dispute tracking module 10. FIG. 7 discloses a screen 60 that may be used by a system user to initiate and manage the dispute process. Particular bills are first selected for the dispute management process. The bills selected may or may not have formal disputes associated with them or a bill may have more than one active dispute associated with it. By selecting "New" from the screen menu 63, the user can retrieve all the bills on the system that have been validated and contain exceptions but have not had active disputes generated for them. The system user may also utilize various criteria 64 to obtain a qualified list of bills. For example, a list (by account number) of new or existing disputes can be selected on the basis of account type, a range of bill dates, account number, or billing carrier. Upon retrieval of a bill for which a formal dispute has not been generated, the exception information included in the bill is displayed for review and evaluation by the system user. A formal dispute may be generated by the system user after review of the exception information. To establish a formal dispute, the system user selects "Generate" from the dispute management screen 63. A unique dispute number is generated by the system, and a formal dispute letter for transmittal to the billing carrier is displayed for review, modification, and approval. Upon approval, the dispute data is stored in the database and the dispute letter generated to hard copy or electronic file for transmittal. Disputes may also be generated for bills for which no exceptions were generated by the validation process. The system user may simply select the appropriate bill by account number and bill date, select "Generate" from the screen menu, make comments appropriate to the particular dispute in the dispute letter, approve the dispute and create a formal dispute.

The dispute management module also provides the opportunity to modify, review, or delete an existing dispute. If the user wants to modify or review a dispute, the user enters the account number or the unique dispute number in the dispute management screen 64, selects "View" from the screen menu 63 and the dispute module will retrieve 60 the particular dispute from the production database. Once the dispute has been retrieved, it is displayed in block 65. The user then has the opportunity to make changes to the dispute. If the user does not make any changes, the dispute is left unchanged. If a change is made to the dispute, the user enters changes through the GUI, selects "Save" from the screen menu 63, and the changes are incorporated into the dispute. The system user may elect, at that time to retransmit the dispute letter to the billing carrier.

The user of the system also has the option of closing a dispute once the discrepancies noted in the charges have been reconciled. Formal reconciliation of disputes with carriers may occur through the inclusion of dispute records in subsequent electronic billings of the affected account, detailing the dispute number, disputed amount, resolved customer amount, sand resolved carrier amount. When dispute records are received for a particular account, an information record is written to the dispute database by the upload module 8, detailing any resolution of the disputed amounts. Through the standard reports module 13, the system user can select a report (Dispute Management Status Report) that notifies the system user of all dispute activity for the period of time selected in the report criteria. To begin, the user enters the identifying information for the dispute through the GUI and the appropriate dispute is retrieved. The dispute is displayed and the user of the system, may indicate that the dispute has been resolved and this dispute report should be closed by entering "Closed" in the Status field of the dispute record. All dispute information is retained in the database, for closed as well as active disputes. Closed disputes may be retrieved by entering the dispute number in the account field of the dispute management screen, or by populating the appropriate selection criteria for the Dispute Management Status Report in the standard reports module 13.

After the charge information has been processed by the data validation module and discrepancies captured as disputes in the dispute management module, the system user then approves or disapproves the charges in the bill review and approval module 11. Bills may be subject to auto-approval (automatic approval for payment without the intervention of a system user) in one or more circumstances. Auto-approval for a bill means that formal approval for a bill is not required, and the bill will not be displayed for approval in the review and approval screen. The bill will, however, be displayed for payment in the payment screen. A bill may be auto-approved for up to a specific amount at the account level (in the account master table), at the vendor level (in the vendor master table), at the company level (e.g., any bill under $100.00 may not require approval), or at the system user level (system users entering bills manually may have approval authority for up to a certain level). Auto-approval is not applied to bills for which exceptions have been generated, either by the validation module, or manually in the review module, and/or for which a dispute or disputes are outstanding. While bills that do not contain exceptions do not automatically appear for review and approval, any bill can be retrieved for display in the review and approval window by entering the account number and bill date in the selection criteria section of the review and approval screen 75 shown in FIG. 9. Bills that have been paid can be displayed for review, but cannot be re-approved for payment.

The bill review and approval module supports the process of reviewing the bill and any information associated with that bill (including disputed items) and approving the bill for payment. Using this module, users may view summary information on the charges (including short pay/disputed amounts), view detailed information on bill items through the standard reports module 13 or the Invoice Detail frame 77 of the invoice approval screen shown in FIG. 9, or view any dispute detail associated with the bill. Bill review and approval provides the functionality to associate summary and detail bill amounts with general ledger codes for accounting and financial tracking. Finally, bill review and approval provides the facility to apply a hierarchical approval mechanism to the approval process.

Figure 8:
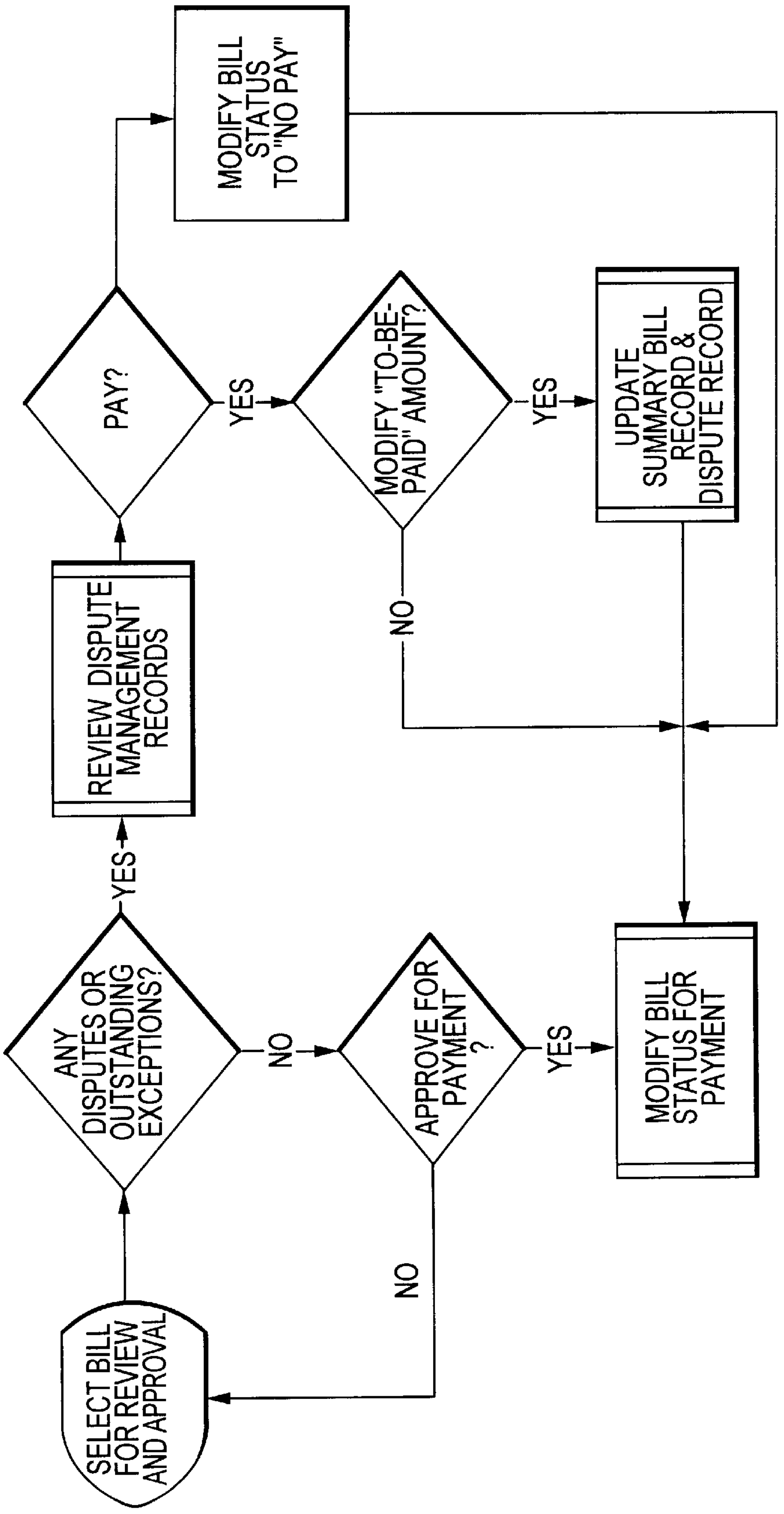
FIG. 8 discloses a flow chart that describes the operation of the bill review and approval module.
Figure 9:
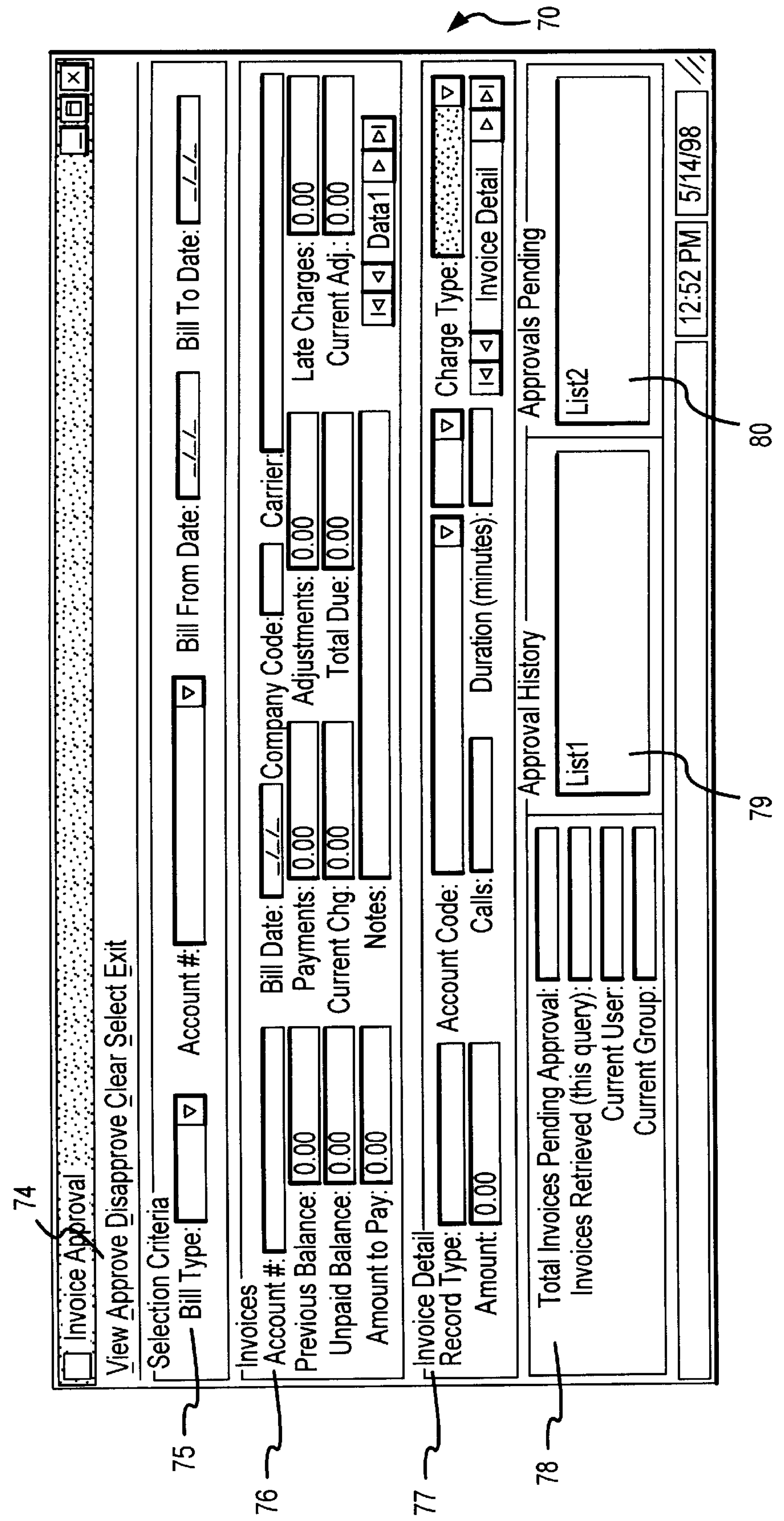
FIG. 9 discloses a screen display that may be utilized by a system user to initiate and manage the bill review and approval process.

The detailed operation of the bill review and approval module is disclosed in FIG. 8. After a user has accessed the bill review and approval module, a screen display 70 disclosed in FIG. 9 provides the means for the user to select a bill or group of bills from the database. Through this screen display, the system user may utilize one or more of the selection criteria 75 to retrieve a bill or range of bills for payment. After the request is input through the screen display, the billed charges are retrieved from the production database and displayed for the user. In this display all the charges may be itemized and dispute amounts, if any, are displayed automatically. Once the system user has all the information necessary in order to either approve or not approve a bill through the screen menu 74, the user can select the appropriate response. The system user may choose to leave the bill information unchanged and return to it at a later point.

The system user may mark the bill as approved in at least two scenarios. If there are no exceptions or disputes associated with this charge, the bill may be marked to be paid (bill status changed to "Pay"). If there are discrepancies or disputes in place for this bill, the system user can mark the bill to be short paid (bill status changed to "ShortPay"). If the system user decides to not approve the bill, The bill status is changed to "NoPay". A note field is provided in the block 76 (Notes) for the system user to enter reasons for the rejection. Reasons for rejection may include disagreement with the disputed amounts, or other perceived discrepancies. After a bill has been rejected for payment, it's status is changed and the bill will appear on the daily status report 102 for further review and disposition. Payment approval may be hierarchical, based upon the amount of the bill. The system user approving the bill may have limited approval authority, up to a certain dollar amount. If a bill is approved by the current system user, but the amount of the bill is above that user's approval authority 171, the bill will then appear for approval in the approval queue of the next user in the approval hierarchy. If only a portion of the bill is being paid because of outstanding discrepancies or disputes, approval authority of the short-pay amount is still based upon the total amount of the original bill, to ensure that regardless of the ultimate disposition of the bill, the same level of scrutiny is applied to the approval process for the total amount of the bill.

Figure 10:
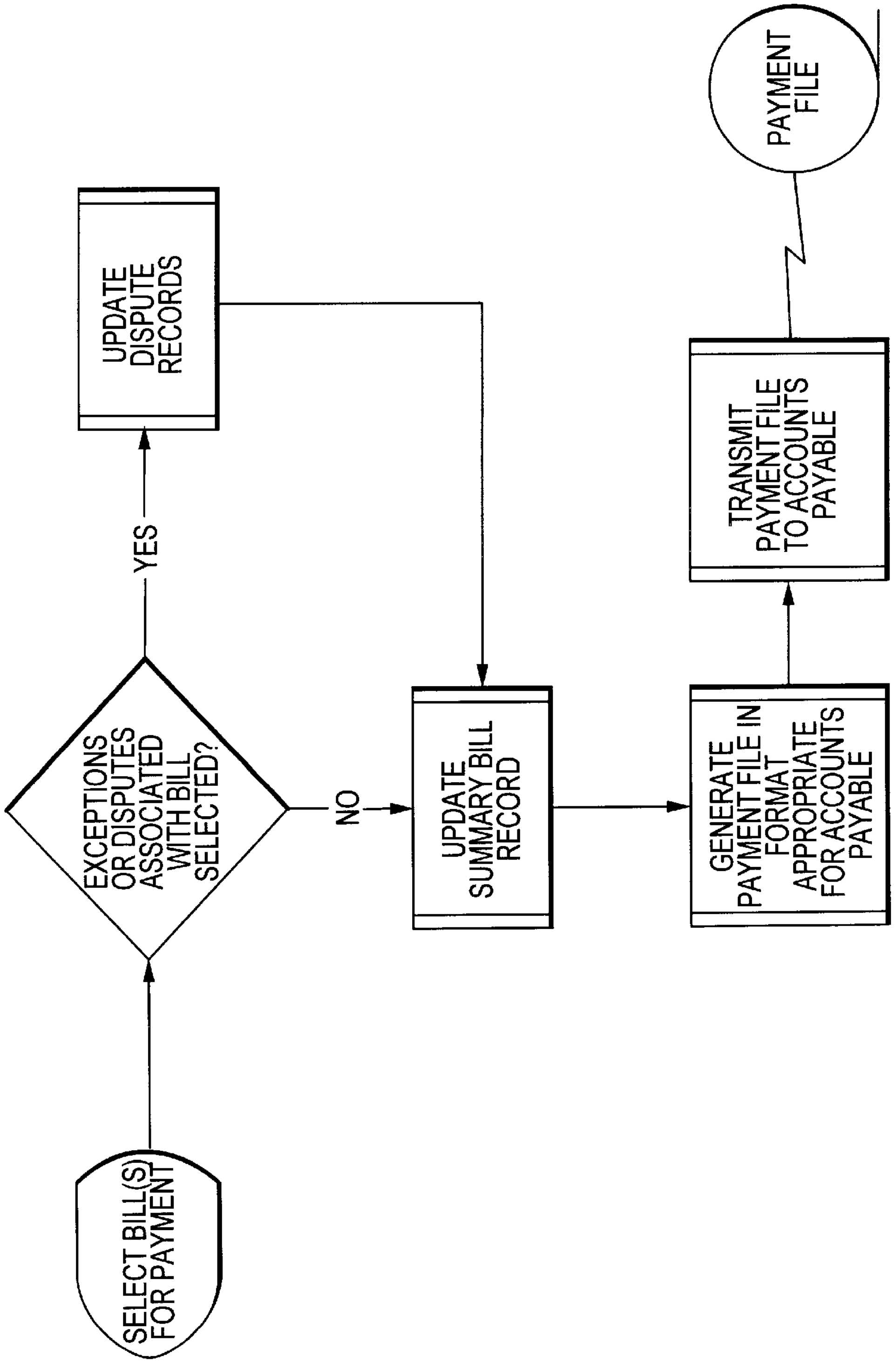
FIG. 10 discloses a flow chart that describes the operation of the bill payment module.
Figure 11:
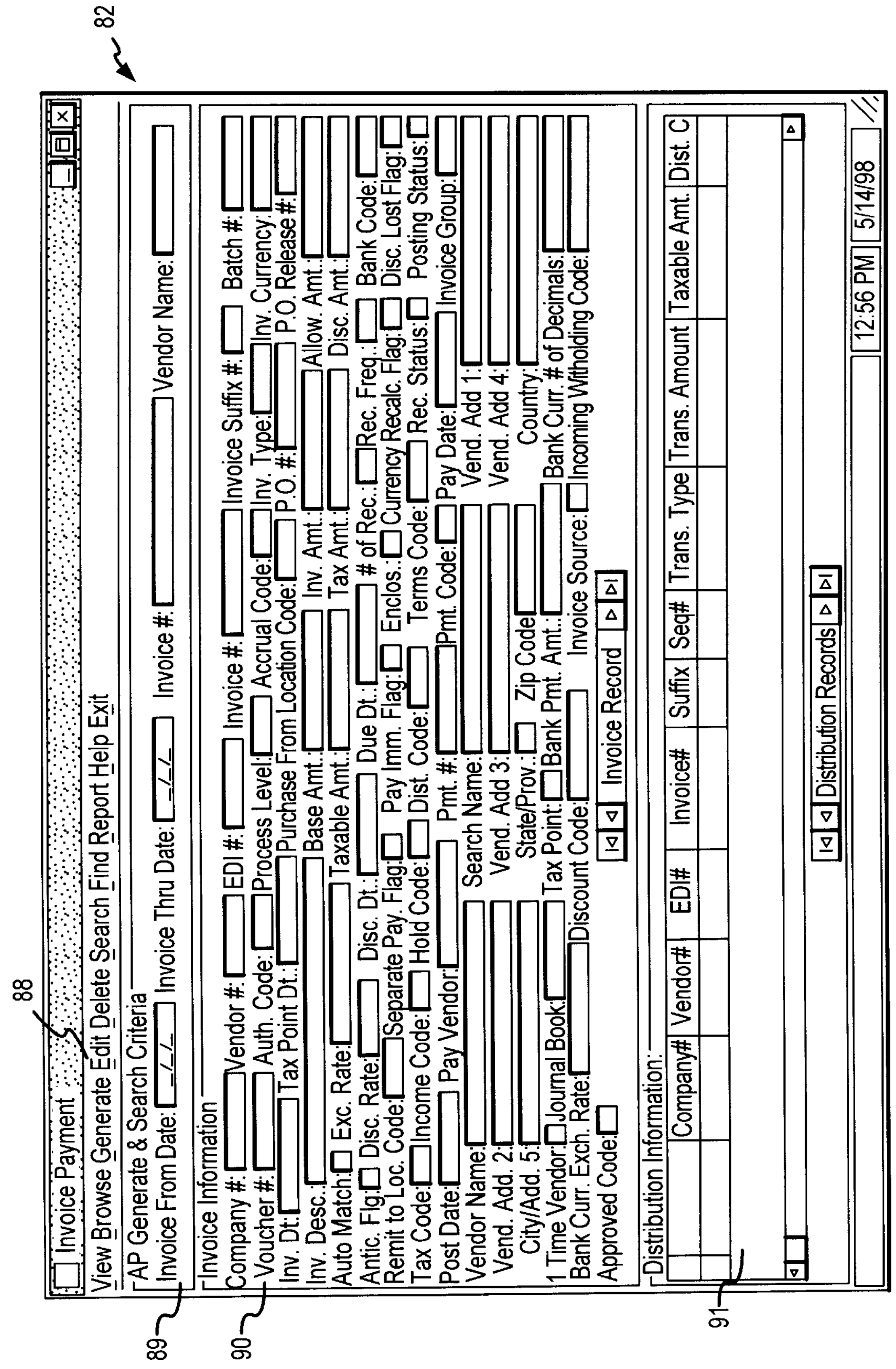
FIG. 11 discloses a screen display that may be utilized by a system user to initiate and manage the bill payment process.

If the bill, or any portion of the bill, has been approved for payment, it will be available for retrieval in the invoice payment module. The flow chart disclosed in FIG. 10 describes in detail the processes performed by the invoice payment module 12. Disclosed in FIG. 11 is a screen display 82 that may be employed by the system user to initiate and manage the invoice payment process. Invoices may be selected for payment 89 by vendor, range of bill dates, invoice number, or all available invoices. Selecting "View" from the invoice payment screen menu 88, results in all invoices eligible for payment being retrieved. Information specific to the output file generated for Accounts Payable 90, 91 can be reviewed and modified for each invoice to be paid. Selecting "Generate" from the invoice payment screen menu 88 results in the creation of an electronic file intended for transmission to the appropriate paying entity. Each bill, for which payment records are generated are examined for the existence of disputes or exceptions. If disputes exist, the appropriate records in the dispute management system are updated to reflect the payments made. The summary bill record for all bills is updated (AP posting date, AP batch number, AP account codes paid to) to reflect payments made and the bill status is updated to "Paid". In the final step of the process, the electronic payment file is transmitted to Accounts Payable for accounting and payment processing.

Figure 12:
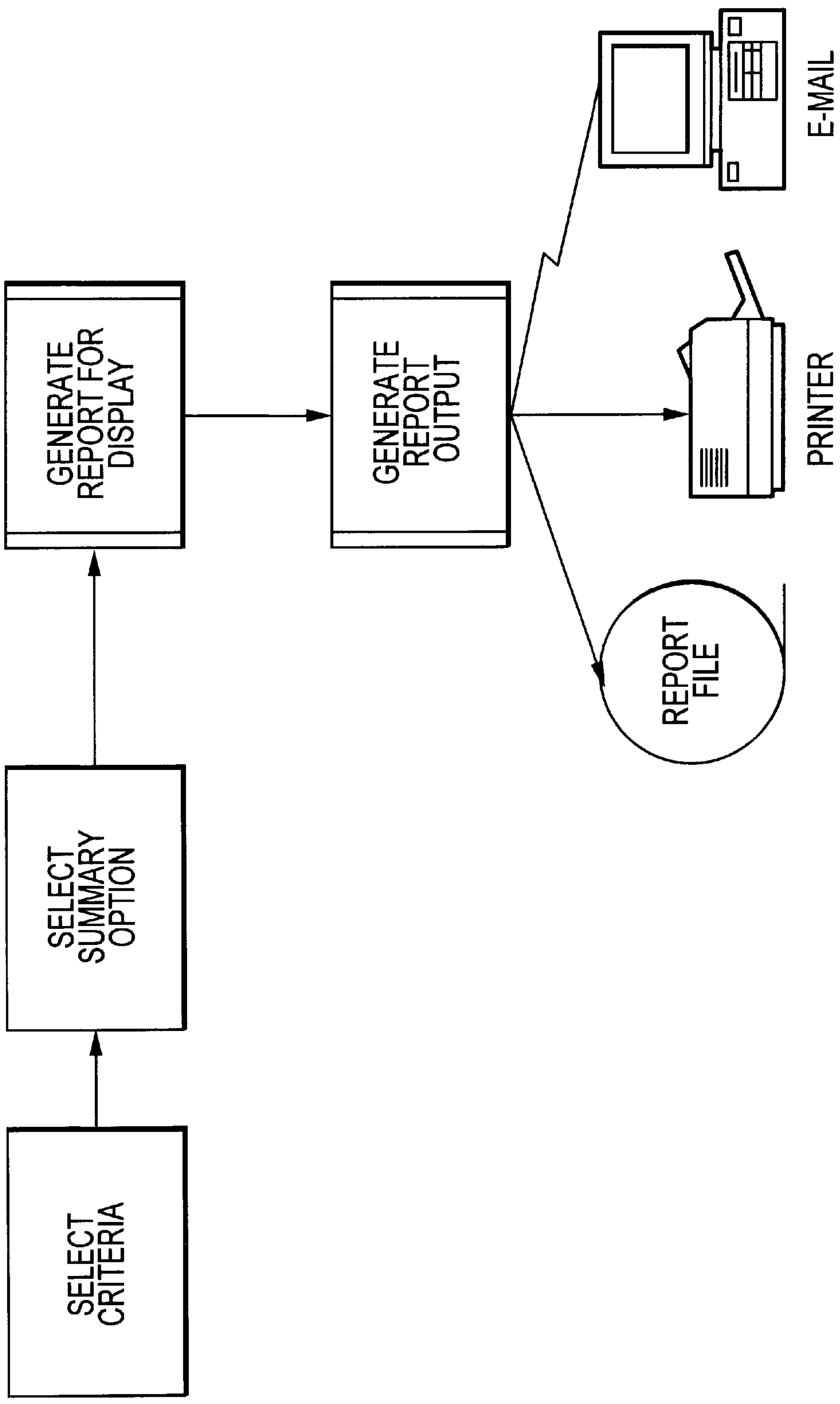
FIG. 12 discloses a flow chart that describes the operation of the standard reports module.
Figure 13:
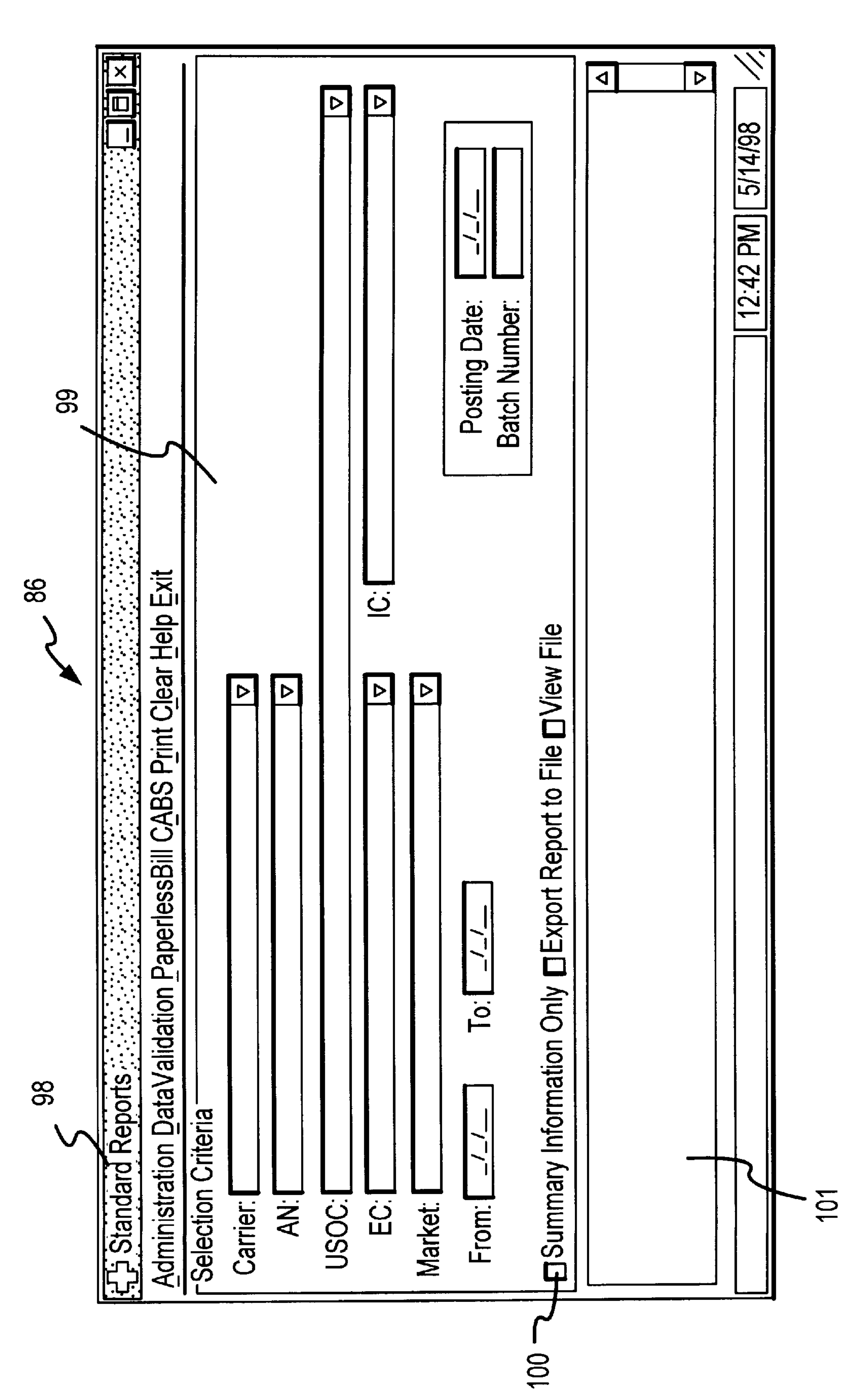
FIG. 13 discloses a screen display that may be utilized by a system user to select and print CABS standard reports.
Figure 14:
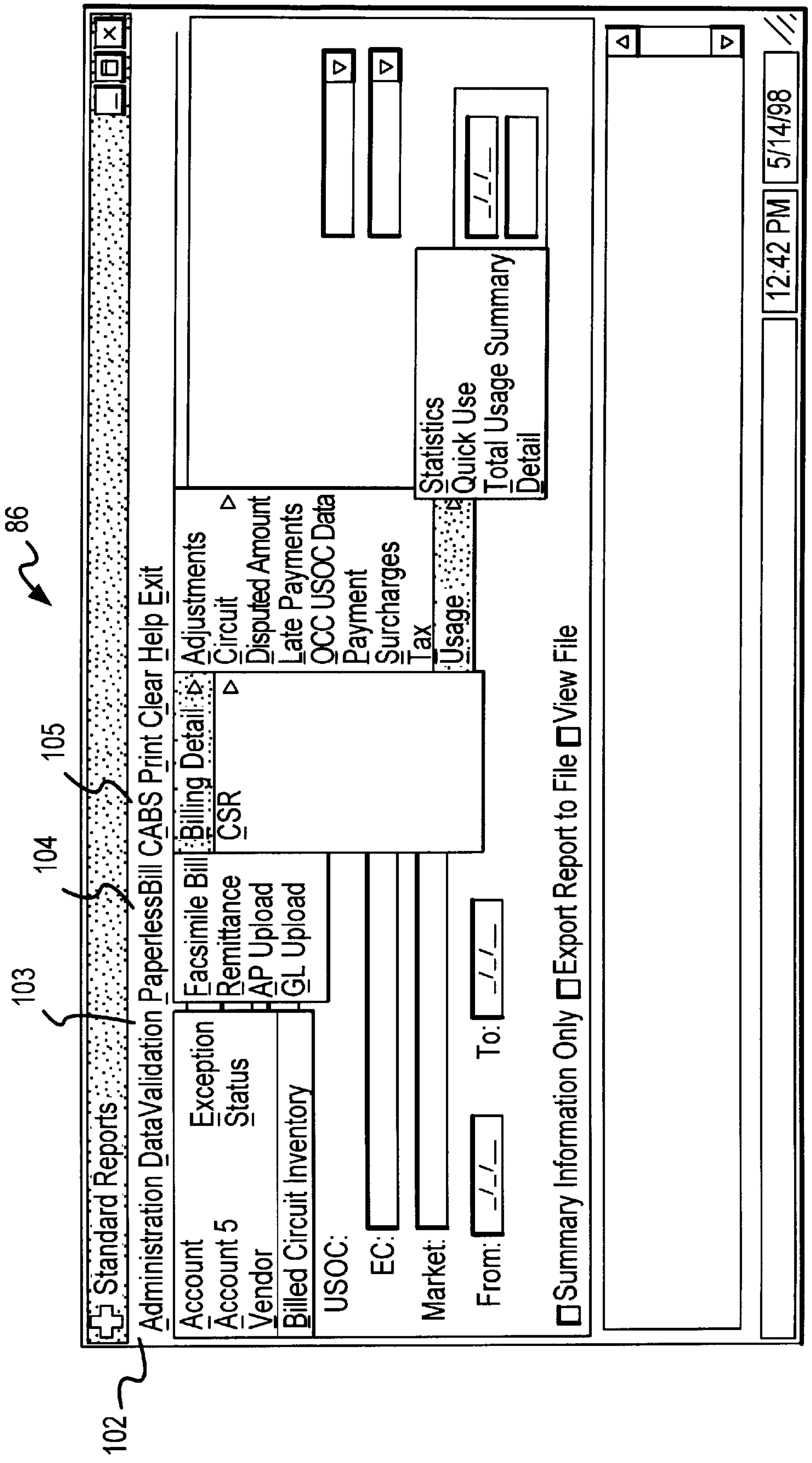
FIG. 14 discloses a screen display that illustrates several of the reports that are available in the CABS standard reports screen.
Figure 15:
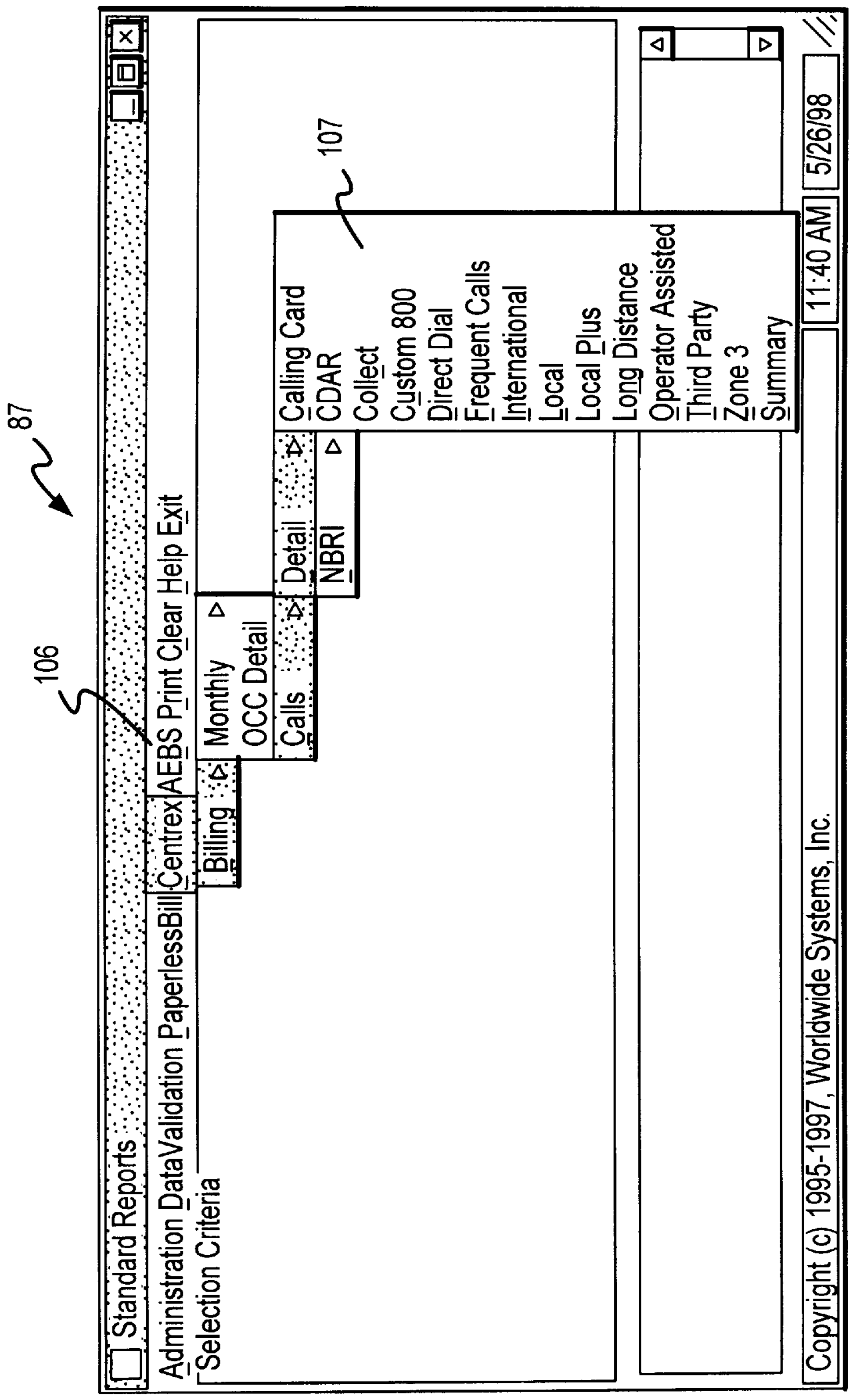
FIG. 15 discloses a screen display that illustrates several of the reports that are available in the CRIS standard reports screen.

The system provides for the display and output of billing and related information in a number of formats through the standard reporting modules. The processes performed in the standard reporting modules are disclosed in the flow chart of FIG. 12. The standard reporting modules are divided into the CABS (Bellcore) standard reporting module represented by screen display 86 in FIGS. 13 and 14, and the CRIS standard reporting module represented by the screen display 87 in FIG. 15. The standard reports for each module are divided into functional groups, including administration 102, data validation 103, paperless bill 104, CABS (billing detail) 105, CENTREX (billing detail) 107, and AEBS (billing detail) 106. A field on each standard report module 101 displays a complete description of the report selected, its purpose, and its format, including the order and grouping of information on the report. The standard reports modules give the system user the discretion to populate each report with the particular subset of information specific to the users' needs through the selection criteria available and unique to each report. For example, if a master account administrative report 102 is selected, only the selection criteria appropriate for that report is displayed (account number, carrier -to select all the accounts for a particular carrier, to and from bill dates to select a particular bill date or a range of bill dates) in the selection criteria area 99. The system user may or may not use one, a few, or all the criteria displayed to build the set of information desired. Some reports, because of the volume of data involved, require that selection criteria be utilized to limit the size of the data retrieved to populate the report. Selecting "Print" for that type of report where no criteria was selected results in a message requesting that criteria be selected. Some of the selection criteria fields may include pull-down lists of information specific to the report selected from which to select. For example, selecting the account status report would generate a list for pull-down and selection in the account criteria field representative of all the accounts available to report on. Pull-down selection criteria lists are only populated with data for which there is information specific to that item residing on the production database 5. The system user would not be provided with selection items in a pull-down list for which there was no data available. After the criteria has been entered or selected from a pull-down list, the user can select "Print" from the standard report module screen menu 98 to generate the report and display the information on the system user's screen. The system user may output the report to a number of formats, including hard copy, print file, e-mail attachment, industry standard word processing formats, and web page publishable documents. Summary information only may also be selected in order to print a report with only summary and grand totals displayed. Reports are available in blocks in 105, 106, 107 representative of all the billing detail that the system user would have available if the bill were received in hard copy. Additional information is provided on each report where industry standard codes are utilized on the electronic billing files to save file space. The reference database 7 contains the descriptive information applicable to all the standard codes (USOC, FID, Phrase Codes, Bellcore acronyms) used in electronic billing. When a report is generated for a coded billing item, the applicable descriptive phrase, as well as the code, is printed in the standard report. For example, if a report contained a USOC (uniform service order code) code, the descriptive phrase associated with that code (specific to the carrier providing the billing, if appropriate) is printed on the report next to the original USOC code. The report information displayed is grouped in meaningful units appropriate for the type of report displayed or printed. For example; account status reports are grouped first by carrier, then by account number, and then in ascending order by bill date (most recent bill first). Exception fields on a particular report may be highlighted. For example; certain bill status' ("New", "NoPay", "ShortP", "Except") on an account status report 102 are displayed in red.

Figure 16:
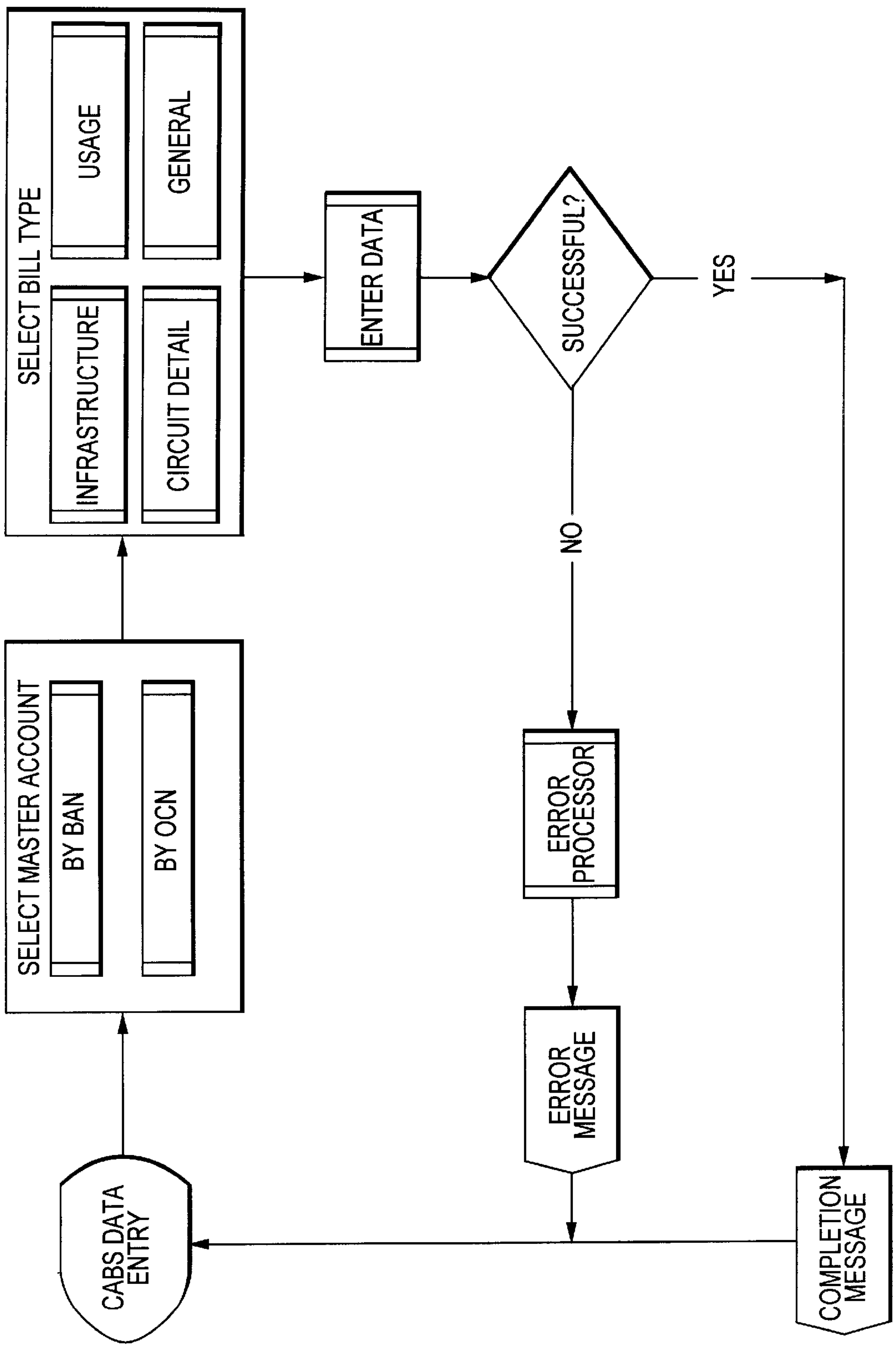
FIG. 16 discloses a flow chart that describes the operation of the CABS Data Entry module.
Figure 17:
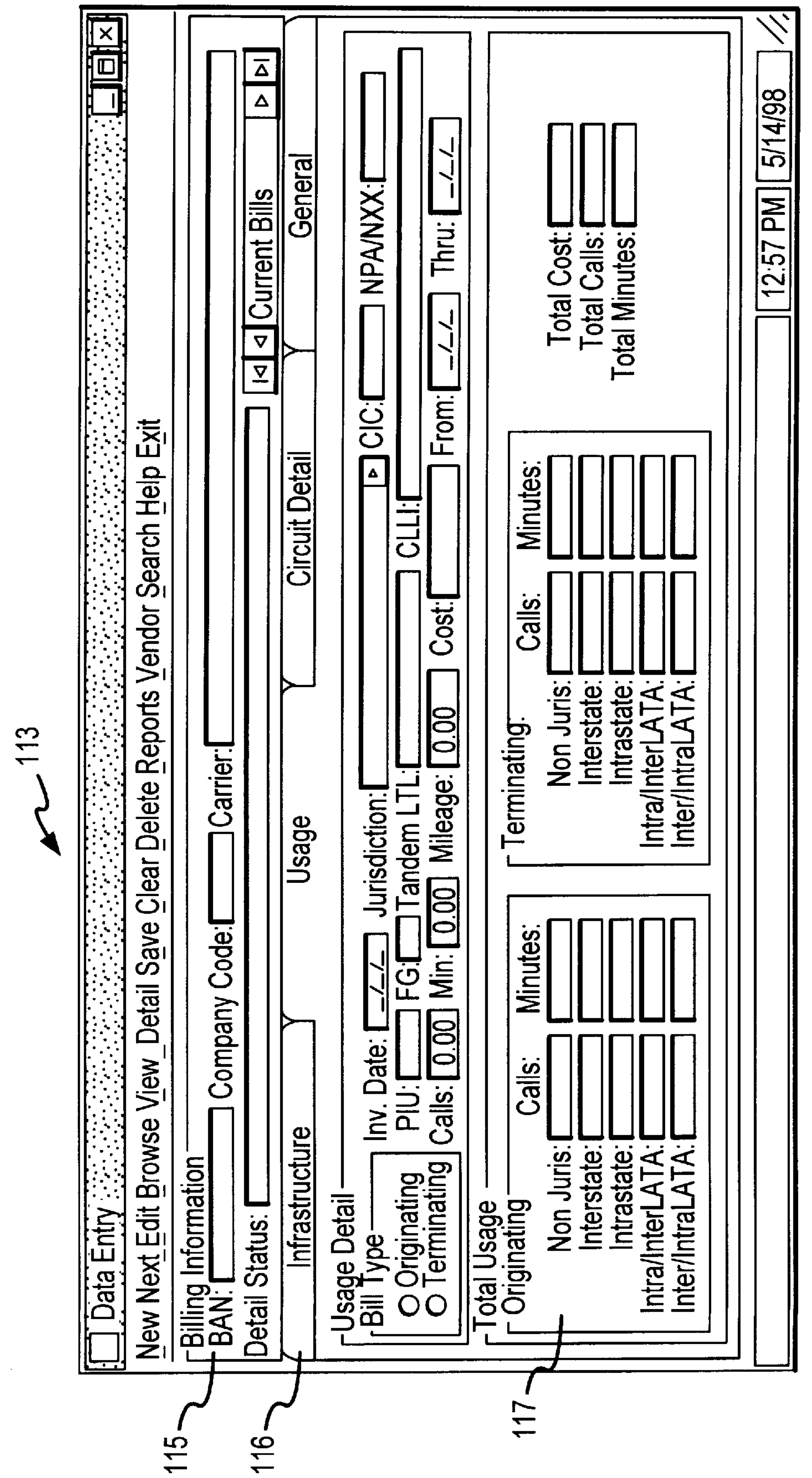
FIG. 17 discloses a screen that may be utilized by a system user to facilitate manual data entry for CABS bills.
Figure 18:
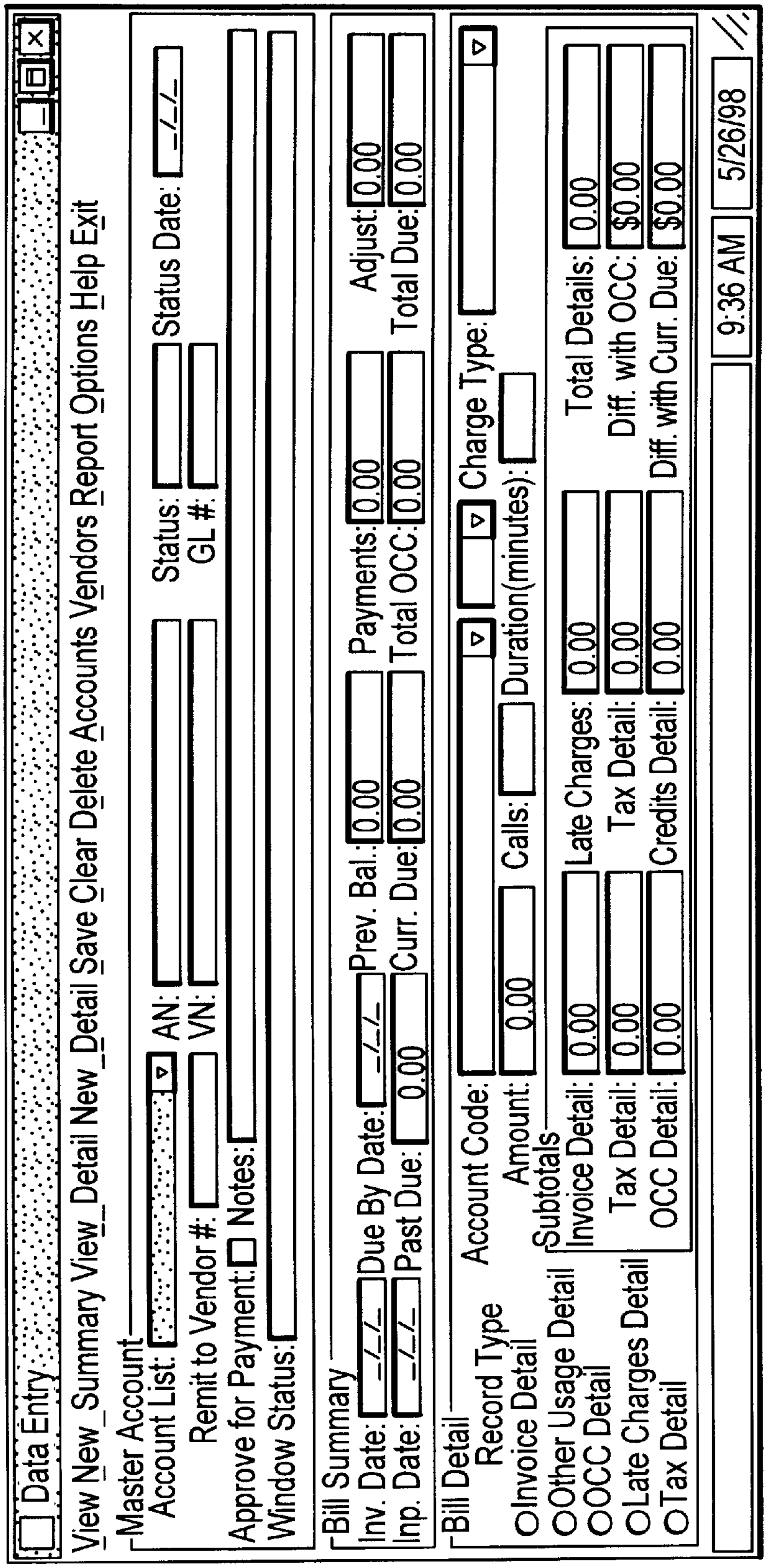
FIG. 18 discloses a screen that may be utilized by a system user to facilitate manual data entry for CRIS bills.
Figure 19:
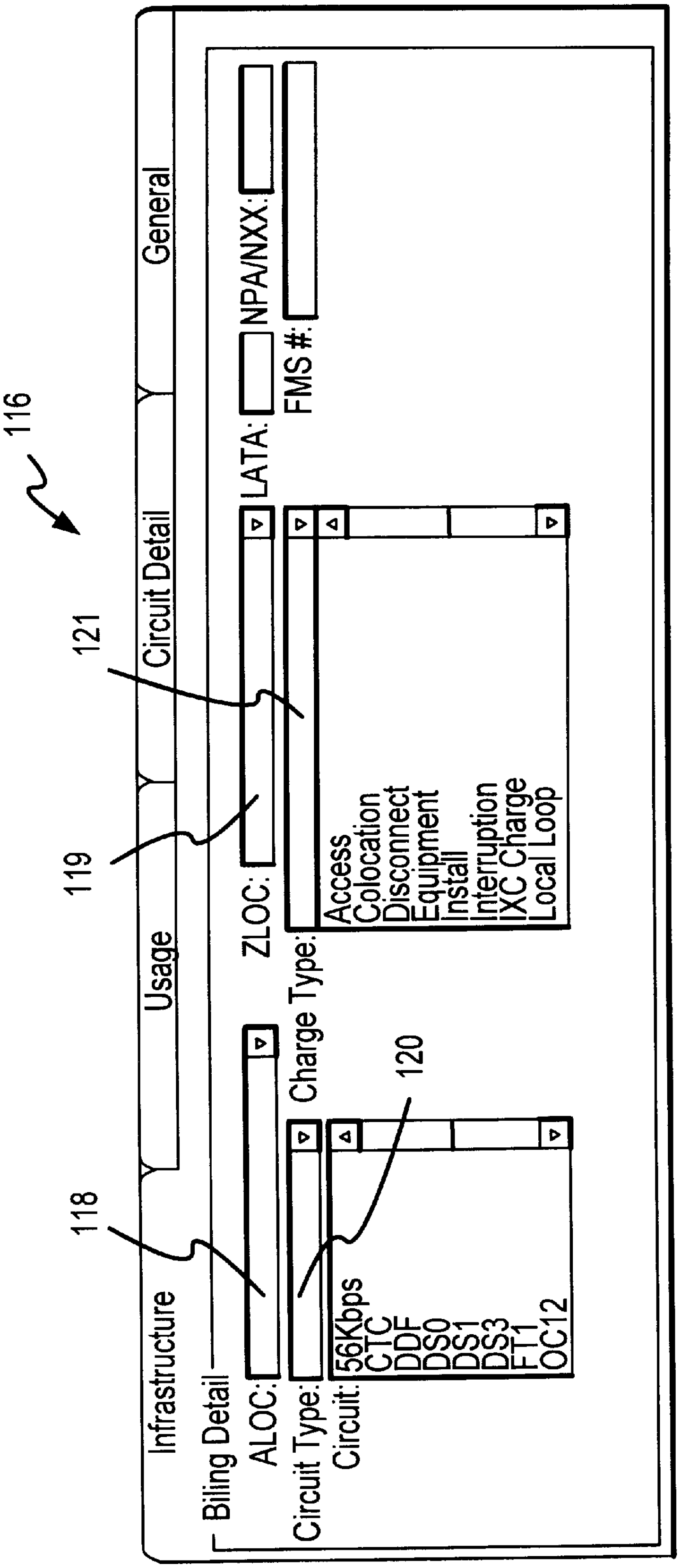
FIG. 19 discloses the Infrastructure section of the CABS data entry screen.
Figure 20:
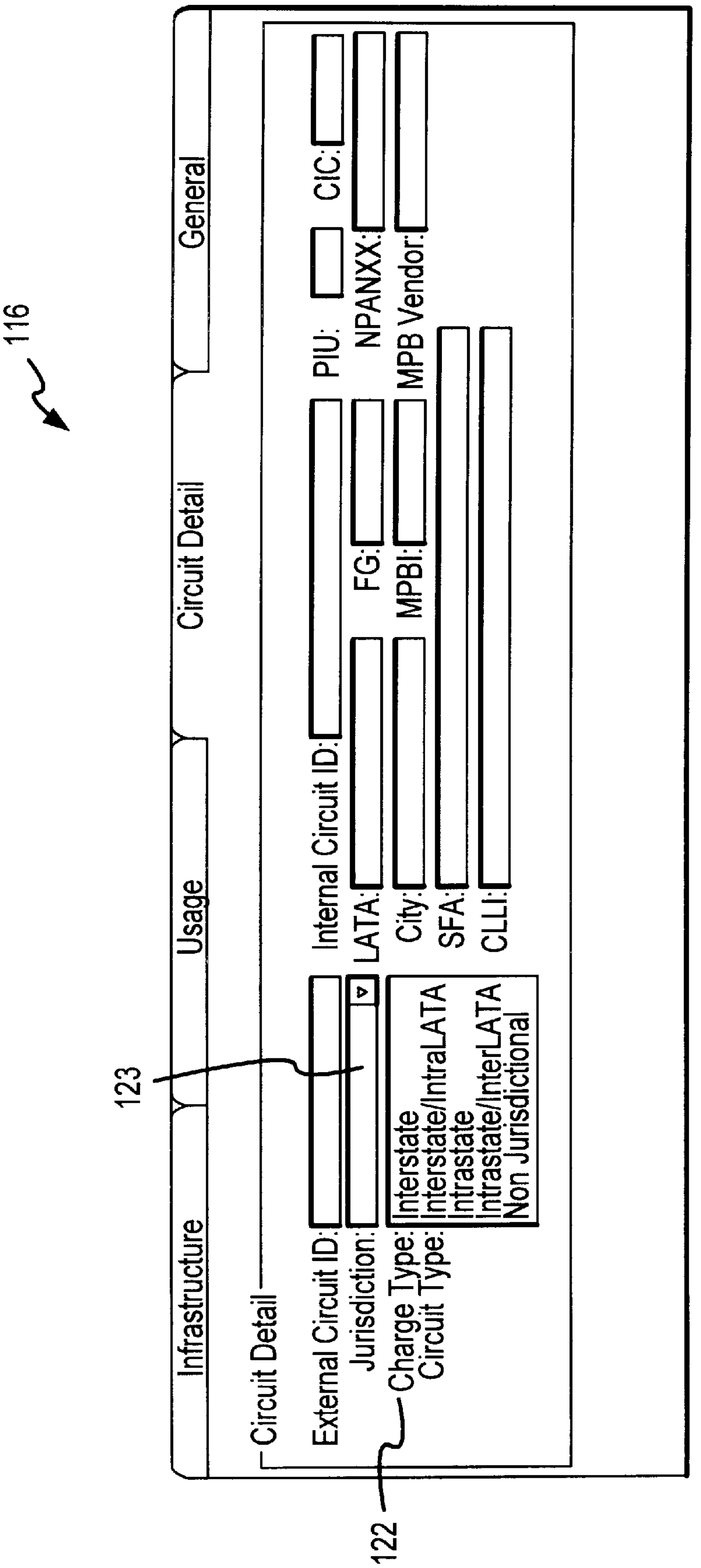
FIG. 20 discloses the Circuit Detail section of the CABS data entry screen.
Figure 21:
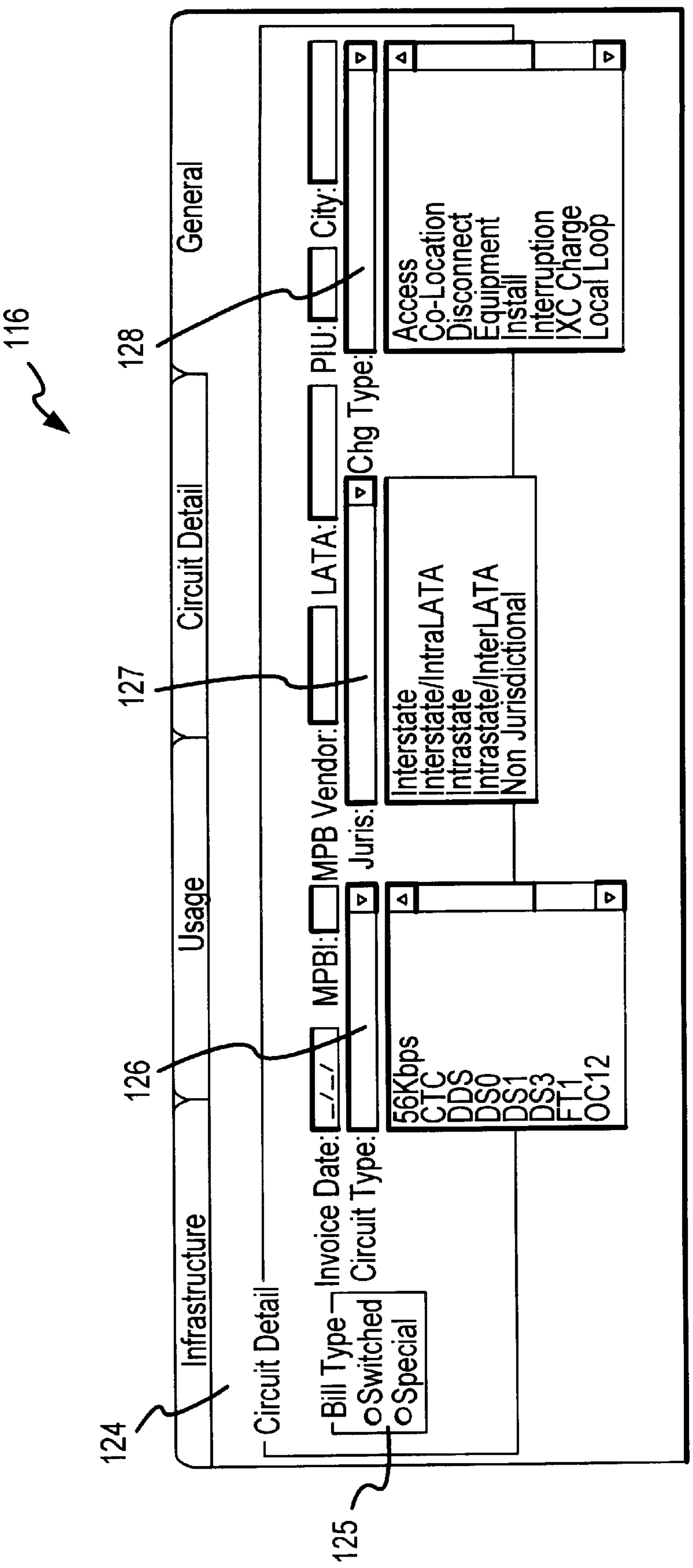
FIG. 21 discloses the General section of the CABS data entry screen.

There are those billing carriers and vendors that do not have the capability to provide billing in an acceptable electronic format. Billing for those vendors would continue to be in hard copy format, requiring that the system provide for the manual data entry of those bills. The processes performed by the data entry modules are illustrated in the flow chart of FIG. 16. FIGS. 17 and 18 show screen displays 113 and 114 respectively that may be used by a system user to enter bill data manually into the production database. These screens provide the facility to retrieve the appropriate master account information 115 in anticipation of entering new billing information for that account. FIGS. 17, 19, 20, and 21 illustrate screen functions that standardize the data entry process for the user with detailed auditing functions 117, pull-down lists 120, 121, 122, 126, 127, 128 that ensure consistency in data entry for widely varied hard copy billing formats and data content, and flexibility in billing structures 116. The data entry function also supports auto-pay and accounts payable coding at data entry time FIG. 18. If any of the above functions is unsuccessful for whatever reason the error is logged and an error message is generated.

Figure 22:
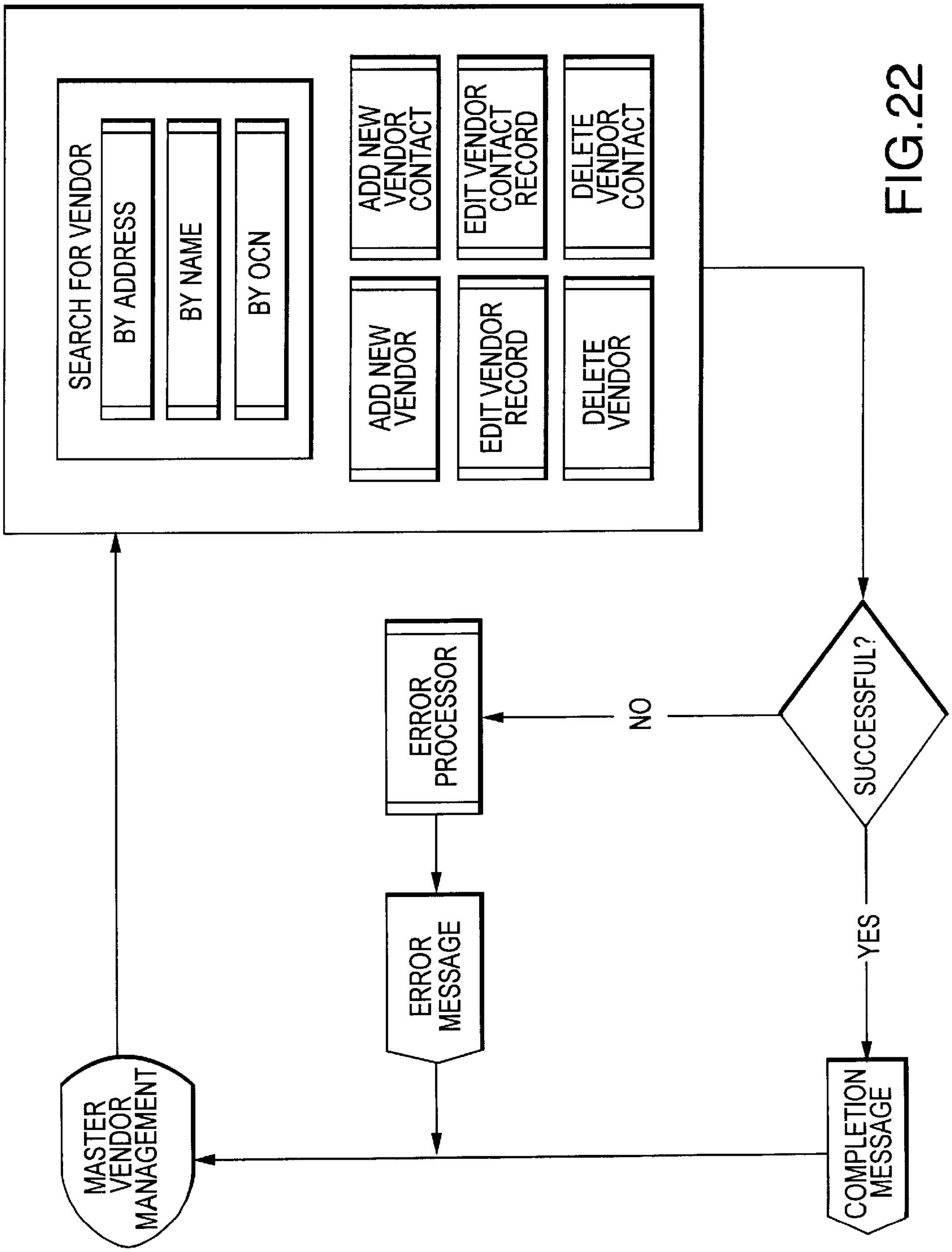
FIG. 22 discloses a flow chart that describes the operation of the master vendor management module.
Figure 23:
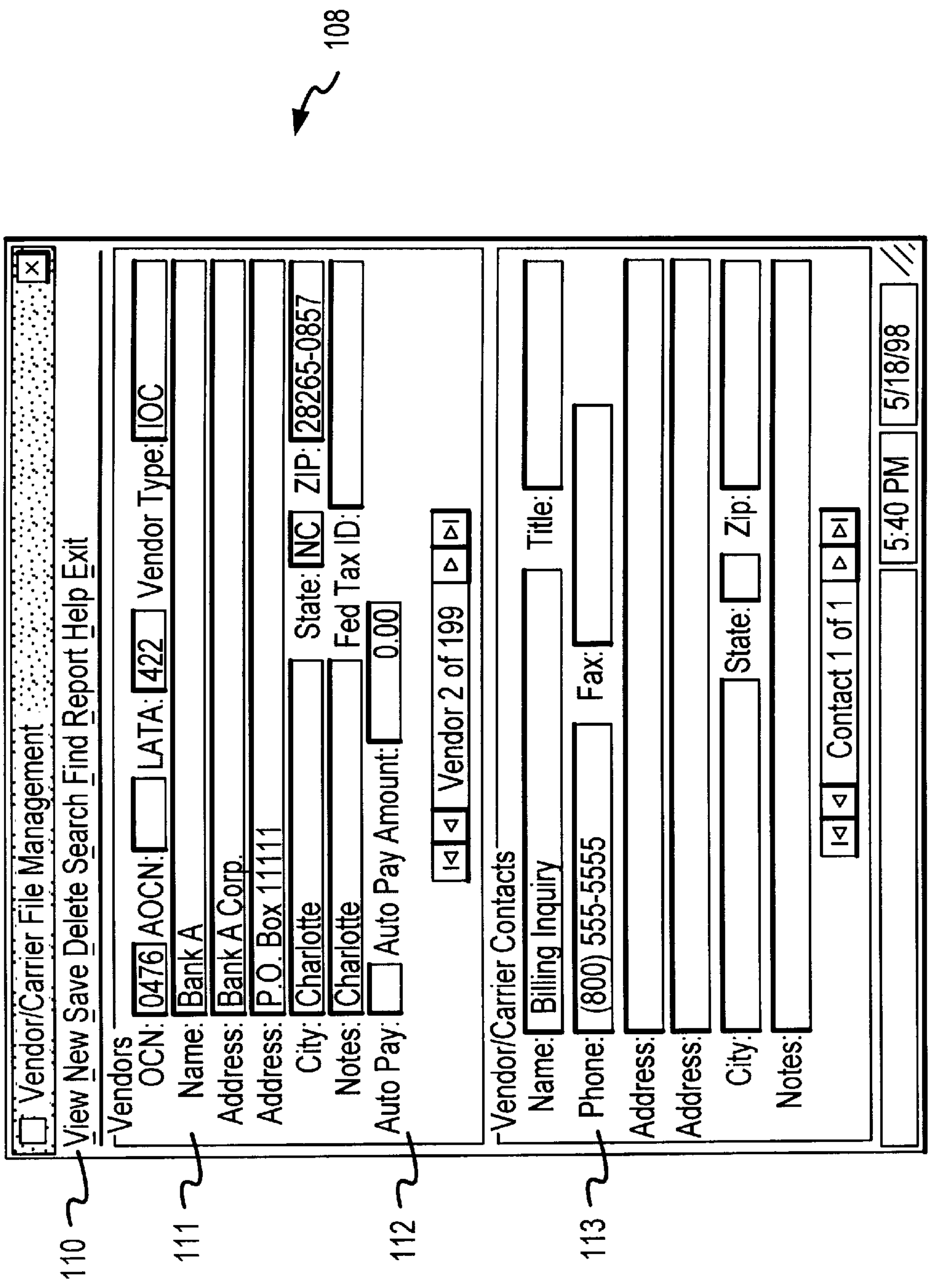
FIG. 23 discloses a screen display that may be utilized by a system user to carry out Master Vendor data management.

Information specific to each billing vendor is maintained in the master vendor table in the reference database 7. This information is maintained by system information managers, and is utilized to provide remit-to address information, auto-pay information, contact information, information for reporting, invoice payment, and access cost information analysis by vendor. The processes performed in the master vendor module are illustrated in the flow chart of FIG. 22. FIG. 23 shows a screen display 108 that may be used by a system user to manage master vendor information resources. Vendors already in the database can be located in various ways, by searching on OCN (operating company number), vendor name, or vendor city 111. New vendors can be added 110, current vendor information can be changed, and vendors can be deleted 110 from the master vendor table if there are no bills on the system for that vendor. Auto pay information specific to the vendor is maintained in the master vendor table 112. Multiple contact records can be associated with each vendor 113 and can be added, changed, and deleted by system information managers without limitation. Invoices cannot be processed by the system for a vendor that is not in the master vendor table. If a vendor search is unsuccessful for whatever reason the error is logged and an error message is generated.

Figure 24:
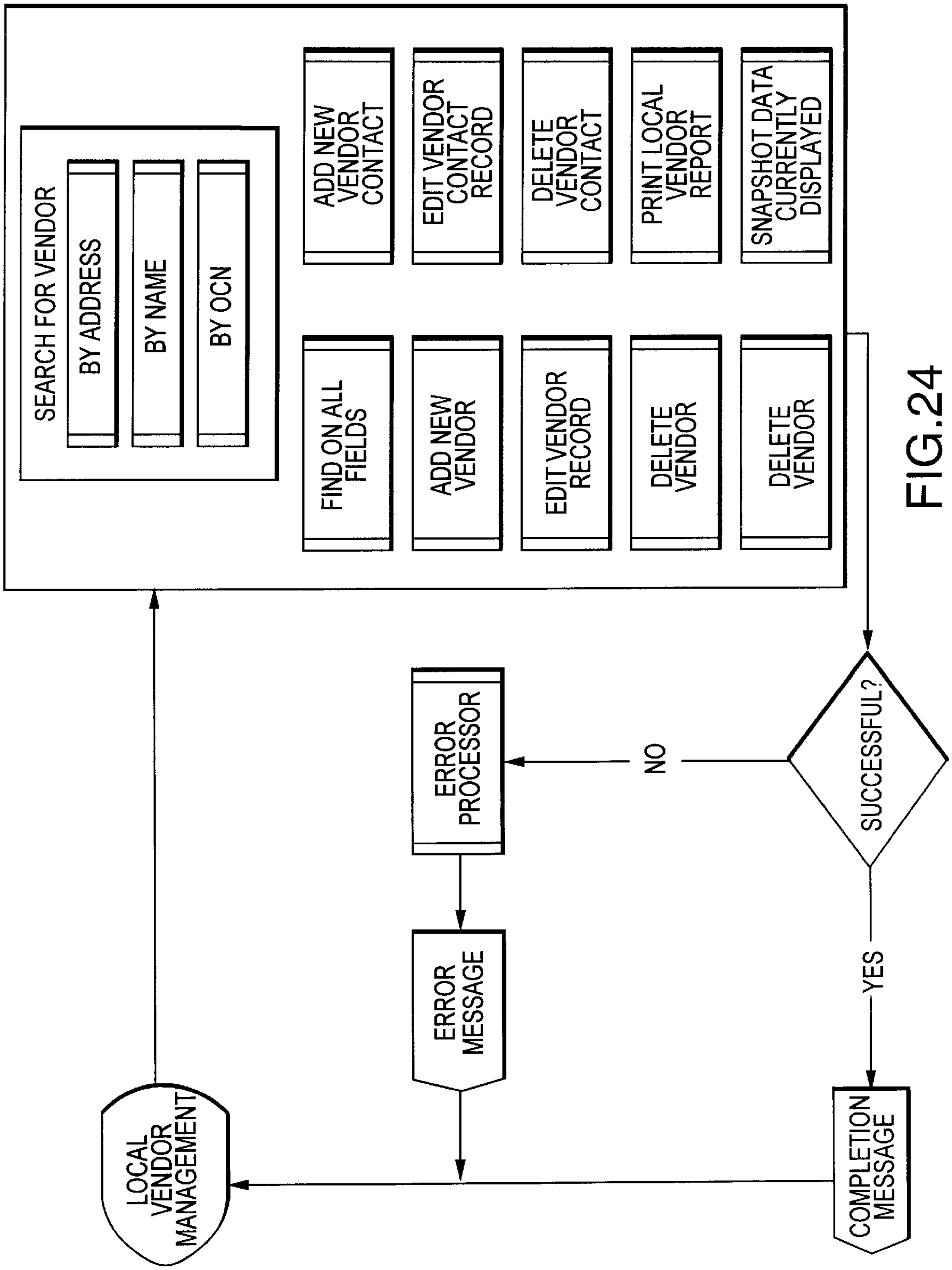
FIG. 24 discloses a flow chart that describes the operation of the local vendor management module.
Figure 25:
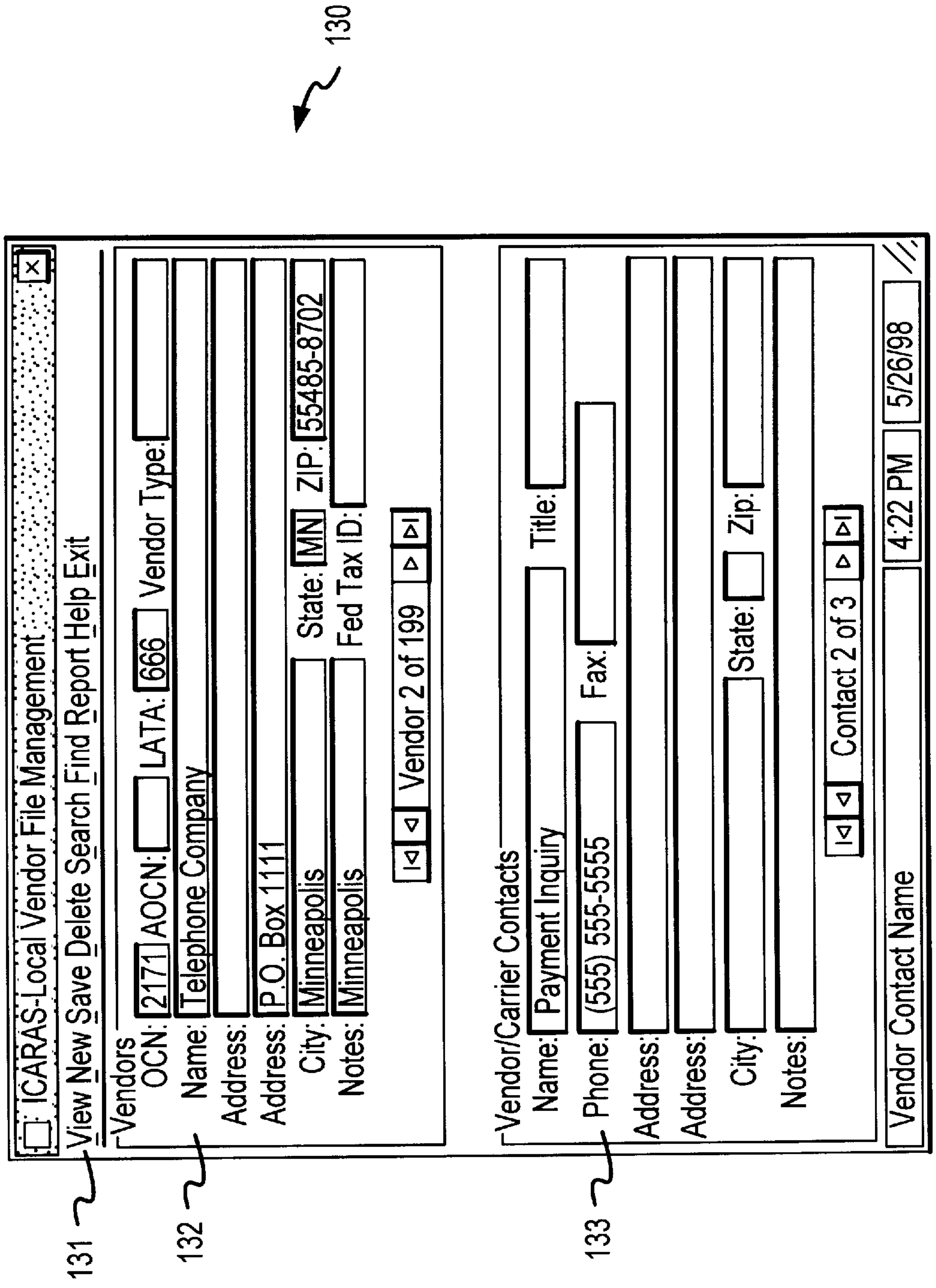
FIG. 25 discloses a screen that may be utilized by a system user to perform local vendor management.

Local system users accumulate a substantial amount of vendor information outside the context of the information managed in the Master Vendor table. In order to provide a shared, readily accessible repository for that information, the local vendor reference information is maintained in the local vendor table in the reference database 7. This information is entered and maintained by all the local system users, and is utilized to provide specific vendor and contact information for shared use. The processes performed in the local vendor module are illustrated in the flow chart of FIG. 24. FIG. 25 shows a screen display that may be used by a system user to manage local vendor information resources. Vendors already in the database can be located in various ways, by searching on OCN (operating company number), vendor name, or vendor city 132. New vendors can be added, current vendor information can be changed, and vendors can be deleted from the local vendor table 131. Multiple contact records can be associated with each local vendor and can be added, changed, and deleted by system users without limitation through block 133. If any of the above functions is unsuccessful for whatever reason the error is logged and an error message is generated.

Figure 26:
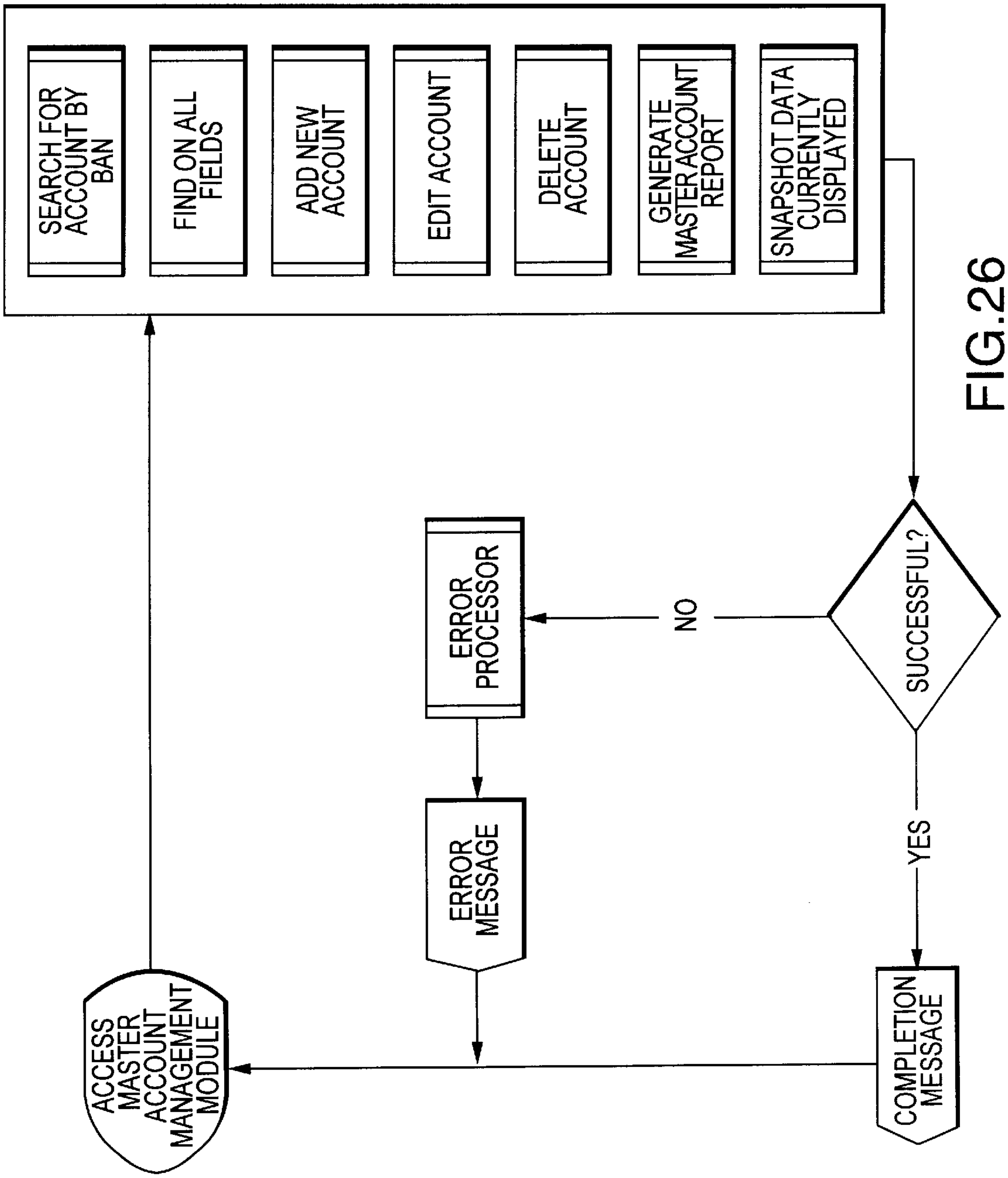
FIG. 26 discloses a flow chart that describes the operation of the master account management module.
Figure 27:
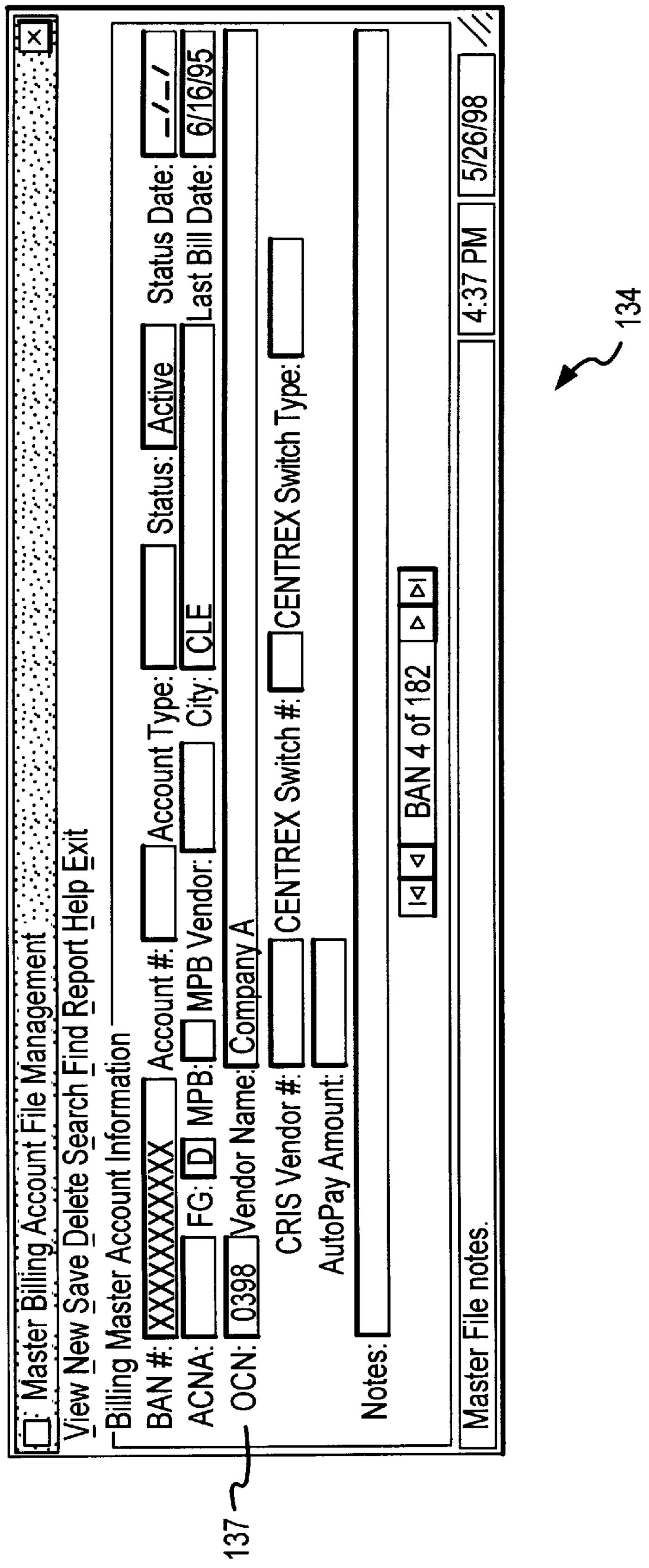
FIG. 27 discloses a screen that may be utilized by a system user to perform master billing account management.

Information specific to each account billed is maintained in the master account table in the reference database 7. This information is maintained by system information managers, and is utilized to provide demographic information, auto-pay information, account status information, vendor associations, previous billing activity information, and information for access cost information analysis by vendor/by account. The processes performed in the master account module are illustrated in the flow chart of FIG. 26. FIG. 27 shows a screen display 134 that may be used by a system information manager to manage master account information resources. Accounts already in the database can be located in various ways, by searching on account number, OCN, and/or account status 137. New accounts can be added, current account information can be changed, if appropriate, and accounts can be deleted from the master account table if there are no bills on the system for that account. New accounts are added automatically during upload processing when that account number does not exist in the master account table. The status of an account added automatically by the upload module is "New" and will appear on the Account Status administrative report. Invoices cannot be processed by the system for an account that is not in the master account table. If any of the above functions is unsuccessful for whatever reason the error is logged and an error message is generated.

Figure 28:
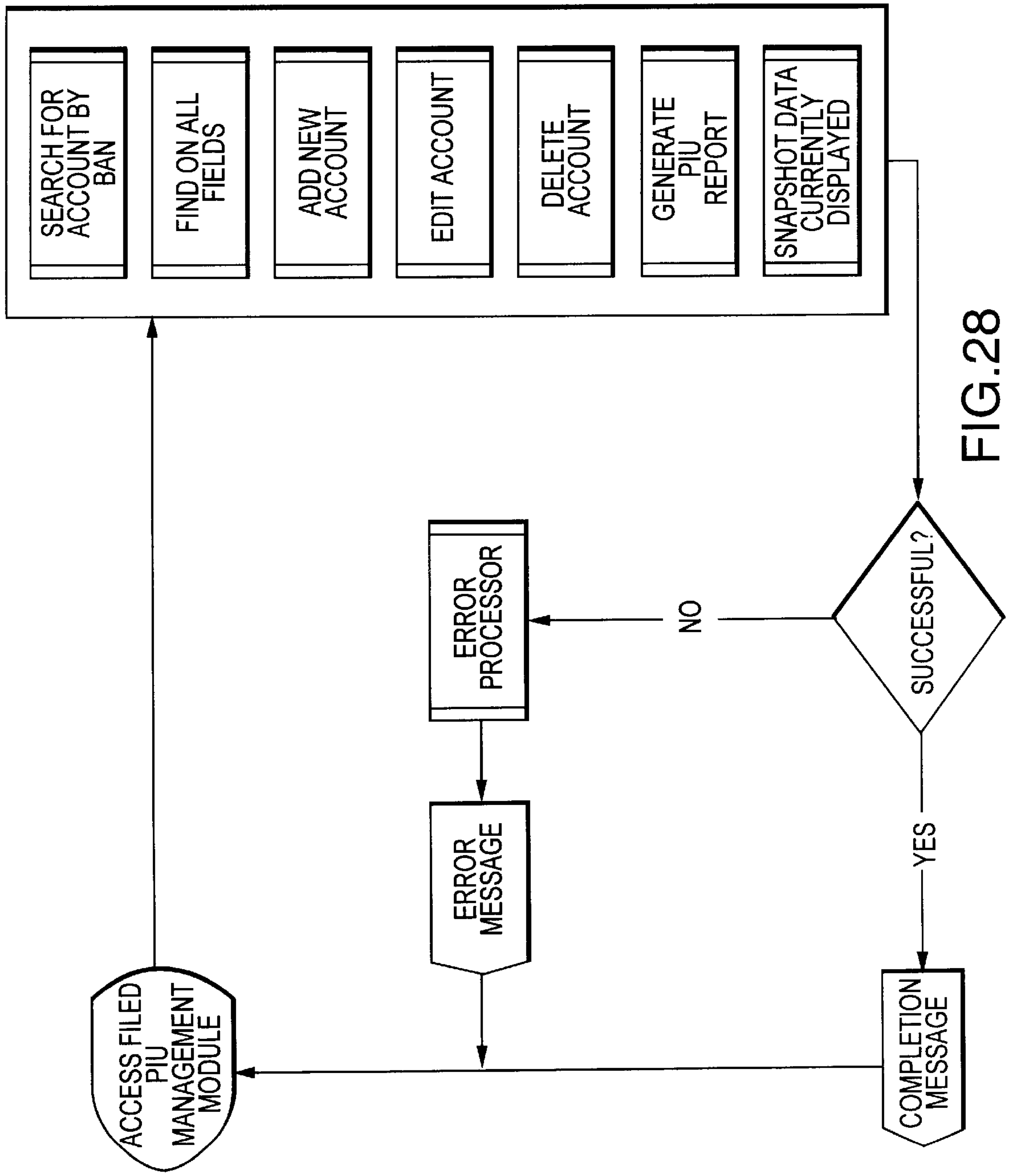
FIG. 28 discloses a flow chart that describes the operation of the filed PIU management module.
Figure 29:
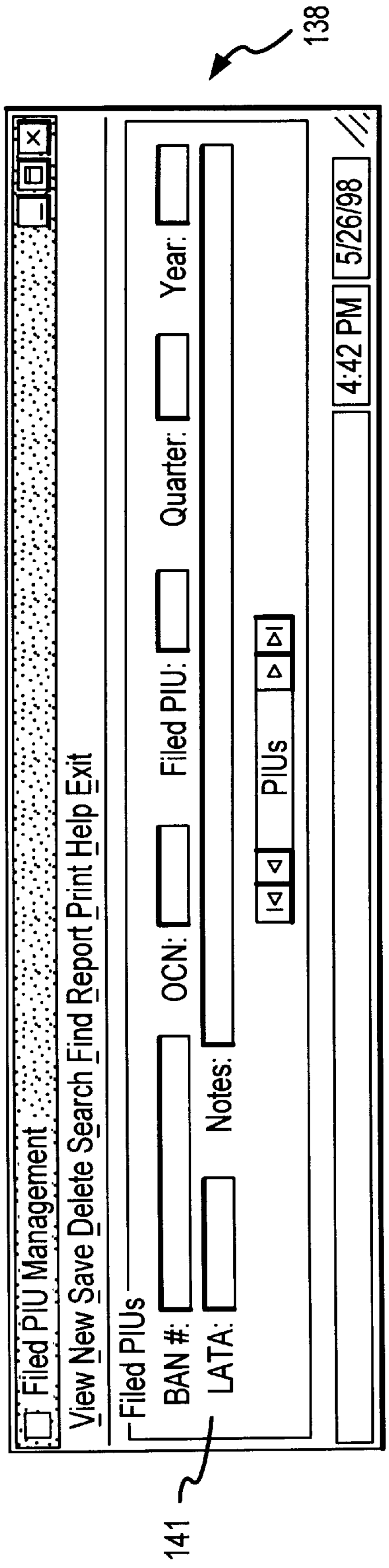
FIG. 29 discloses a screen that may be utilized by a system user to perform filed PIU management.

Carriers can file, with billing carriers, a Percent Interstate Usage (PIU) request to modify access services charges for interstate versus intrastate access. These requests are filed quarterly, and can substantially reduce the service charges applied to access billing. The information maintained in the PIU tables is utilized by the data validation module to determine if the correct services charges have been applied appropriate for the percent of interstate usage filed. The processes performed in the filed PIU management module are illustrated in the flow chart of FIG. 28. FIG. 29 shows a screen display 138 that may be used by a system information manager to manage PIU information resources. Block 141 on this screen provides the facility to locate filed PIUs by account number (BAN) or OCN. The system information manager can also add, change and delete records. Filed PIU records cannot be added if there is no corresponding master account record in the master account table. Filed PIU records cannot be deleted if there is an outstanding dispute in the dispute management table specific to that filed PIU record.

Figure 30:
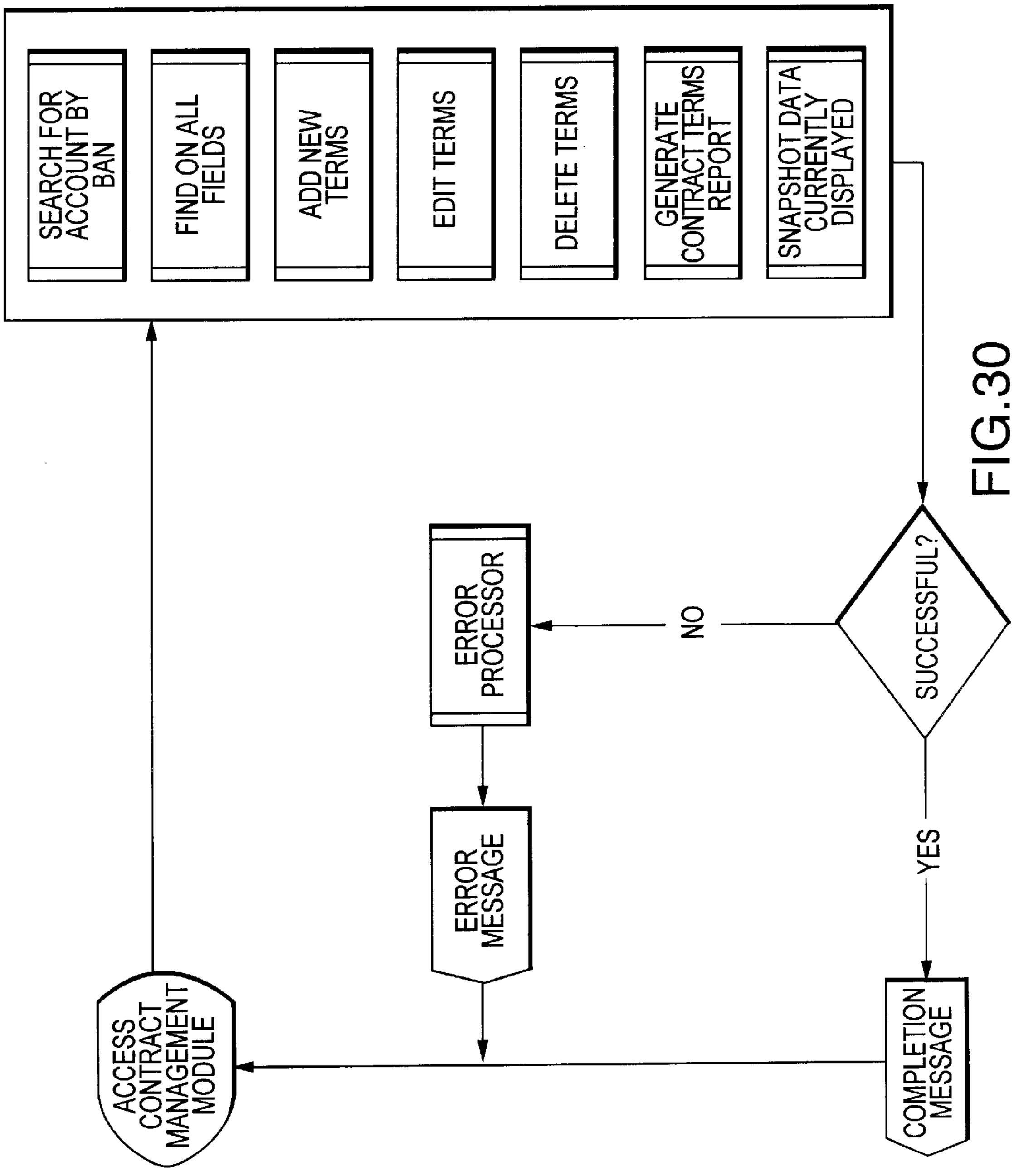
FIG. 30 discloses a flow chart that describes the operation of the contract management module.
Figure 31:
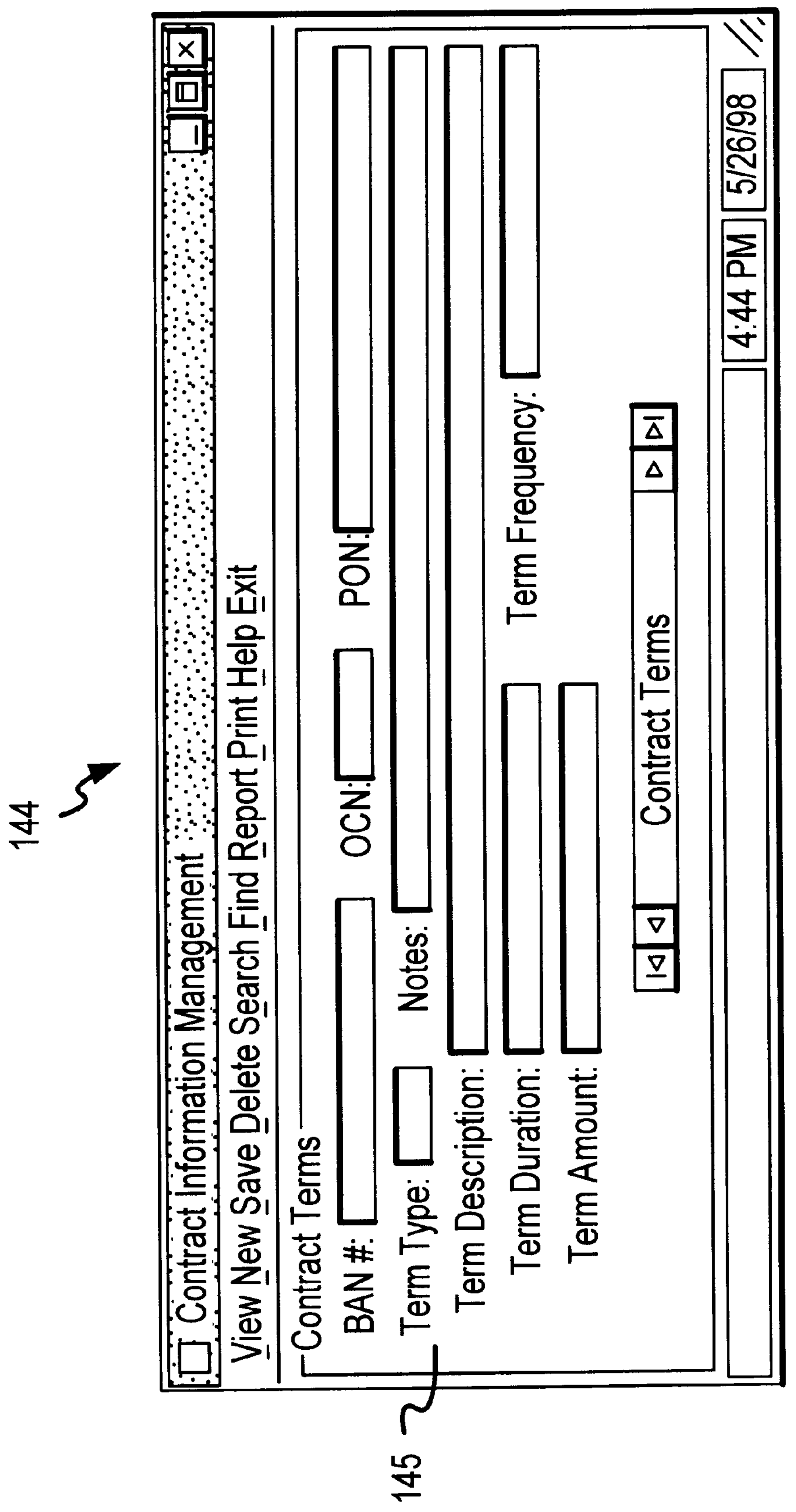
FIG. 31 discloses a screen that may be utilized by a system user to perform contract information management.

Many of the products and services provided between various telecommunications Carriers is facilitated by contract, with charges and rates that may or may not be consistent with tariffed charges and rates. To successfully ensure that the rates and charges are correct, the contract terms specific to those rates must be accessible to the data validation module. The information maintained in the contract management table is utilized by the data validation module to determine if the correct charges and rates have been applied appropriate for the contract terms stated. The processes performed in the contract management module are illustrated in the flow chart of FIG. 30. FIG. 31 shows a screen display 144 that may be used by a system information manager to manage contract term information. This screen provides the facility to locate contract terms by account number (BAN) or OCN. The system information manager can also add, change and delete records through block 145. Contract term records cannot be added if there is no corresponding master account record in the master account table. Contract term records cannot be deleted if there is an outstanding dispute in the dispute management table specific to those contract terms. If any of the above functions is unsuccessful for whatever reason the error is logged and an error message is generated.

Figure 32:
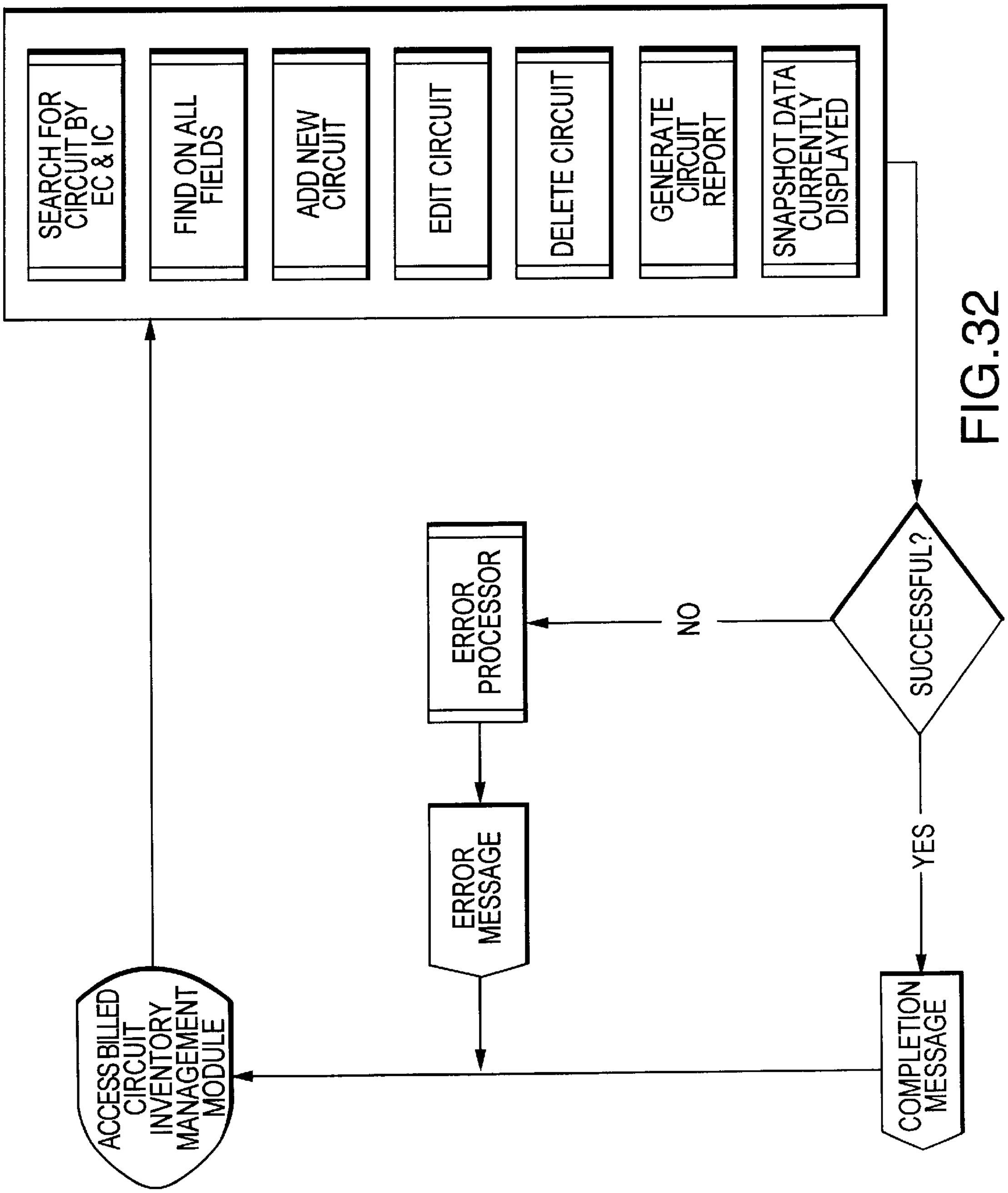
FIG. 32 discloses a flow chart that describes the operation of the billed circuit inventory management module.
Figure 33:
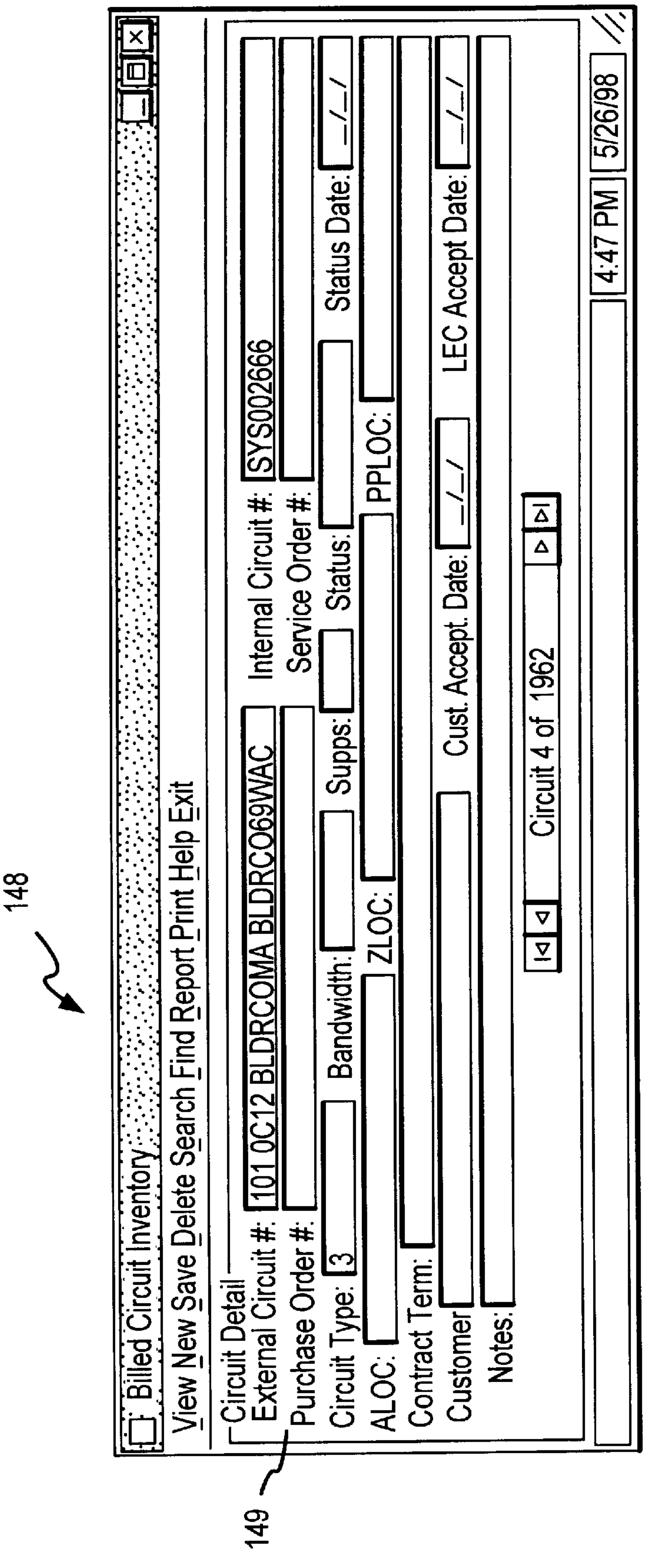
FIG. 33 discloses a screen that may be utilized by a system user to perform billed circuit inventory management.

Telecommunication service providers deliver services and products through communications channels and hardware either owned by them, leased from other providers, or shared with other providers. Charges specific to these communications channels may come in the form of circuit charges. To effectively ensure that the circuit charges received are appropriate for the services provided, each carrier may maintain an inventory of the circuits that they believe are in place. These circuits are distinguished by the EC or external circuit ID provided by the billing carrier, and the IC or internal circuit ID, provided by the billed carrier. If an inventory (usually found in a facilities management system) that can be accessed for use in data validation does not exist, the system provides an alternative. Every unique EC/IC pair received as part of a circuit record containing charges is written to the billed circuit inventory table at the time the electronic record is uploaded. Network planners and provisioners then access the table to ensure that all the information appropriate to that circuit is entered and available for validation of the charges. The information maintained in the billed circuit inventory table is utilized by the data validation module to determine if the correct charges and rates have been applied appropriate for the particular circuit. The processes performed in the billed circuit inventory module are illustrated in the flow chart of FIG. 32. FIG. 33 shows a screen display 148 that may be used by a system information manager, network provisioner, or network planner to manage billed circuit inventory information. Through block 149, this screen provides the facility to locate circuit information by internal and external circuit ID. The system information manager can also add, change and delete records. Billed circuit inventory records cannot be deleted if there is an outstanding dispute in the dispute management table specific to a particular circuit. If any of the above functions is unsuccessful for whatever reason the error is logged and an error message is generated.

Figure 34:
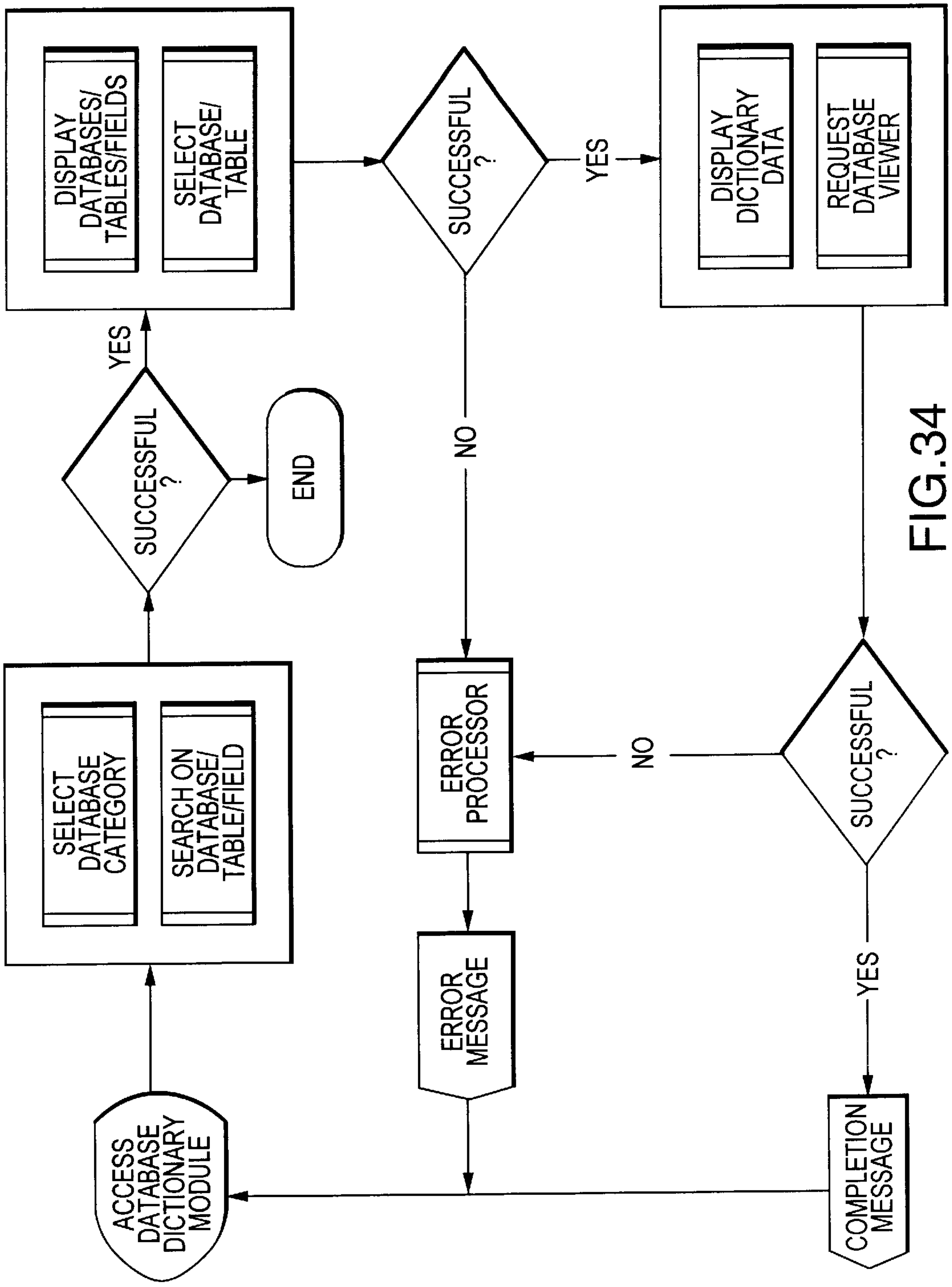
FIG. 34 discloses a flow chart that describes the operation of the database dictionary module.
Figure 35:
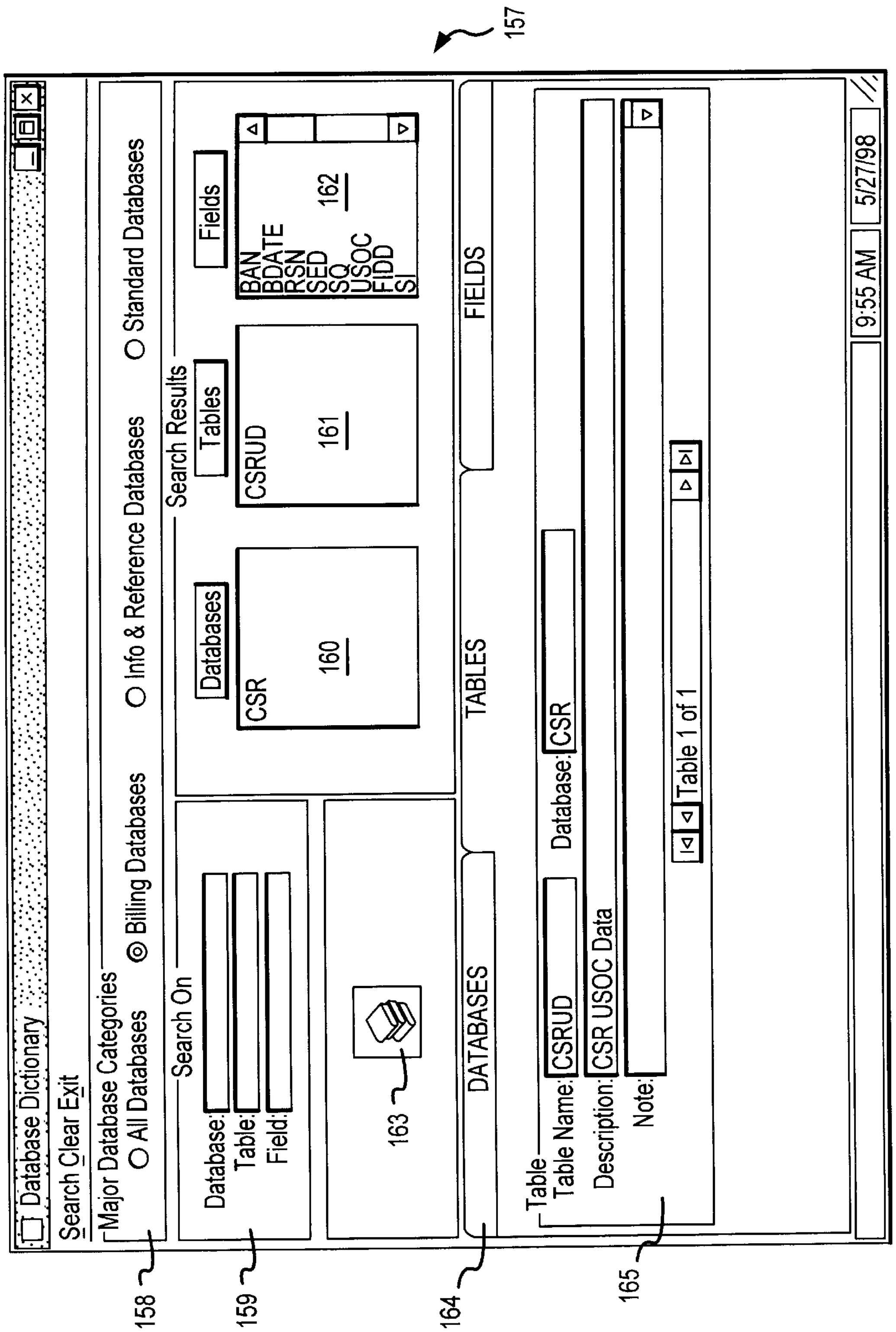
FIG. 35 discloses a screen that may be utilized by a system user to access the database dictionary.
Figure 36:
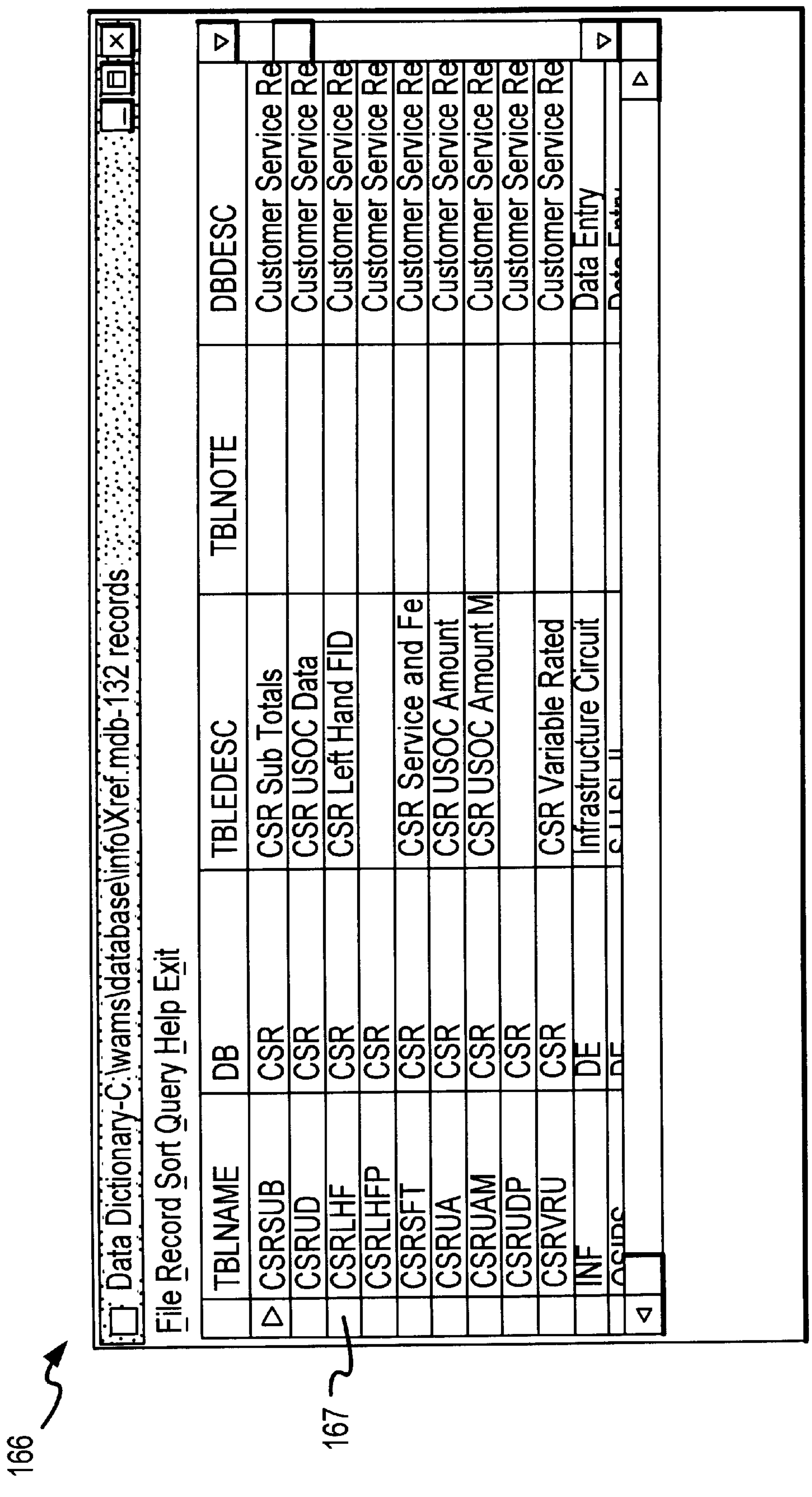
FIG. 36 discloses a screen that may be utilized by a system user to display database data.

Because of the complexity of telecommunications technology and the myriad forms of billing and billing file structures, a methodology for the organization, annotation, rapid location, and retrieval of database information is essential. The database dictionary provides those functions, enabling the system user to easily locate various types of billing information and understand its meaning. The processes performed in the database dictionary module are illustrated in the flow chart of FIG. 34. FIG. 35 shows a screen display 157 that may be used by a system user to access the database dictionary. Information may be selected by database category 158. The system user may also search on a database, table, or field name 159 to retrieve all the information requested. The facility may also be available to retrieve the desired information by first displaying a database 158, 160, clicking on the database to display all the associated tables 161, and clicking on a table to display all the associated fields 162. At each level of the process, detailed information is displayed in the dictionary section 165 of the screen, for review by the system user. The system user can also click on the database viewer command button 163 to load a screen displaying the actual data in the database that the system user was locating information for in the dictionary. The database viewer window also provides the user with the capability to query through screen 166 and sort the database information displayed 167, or return to the dictionary screen.

Figure 37:
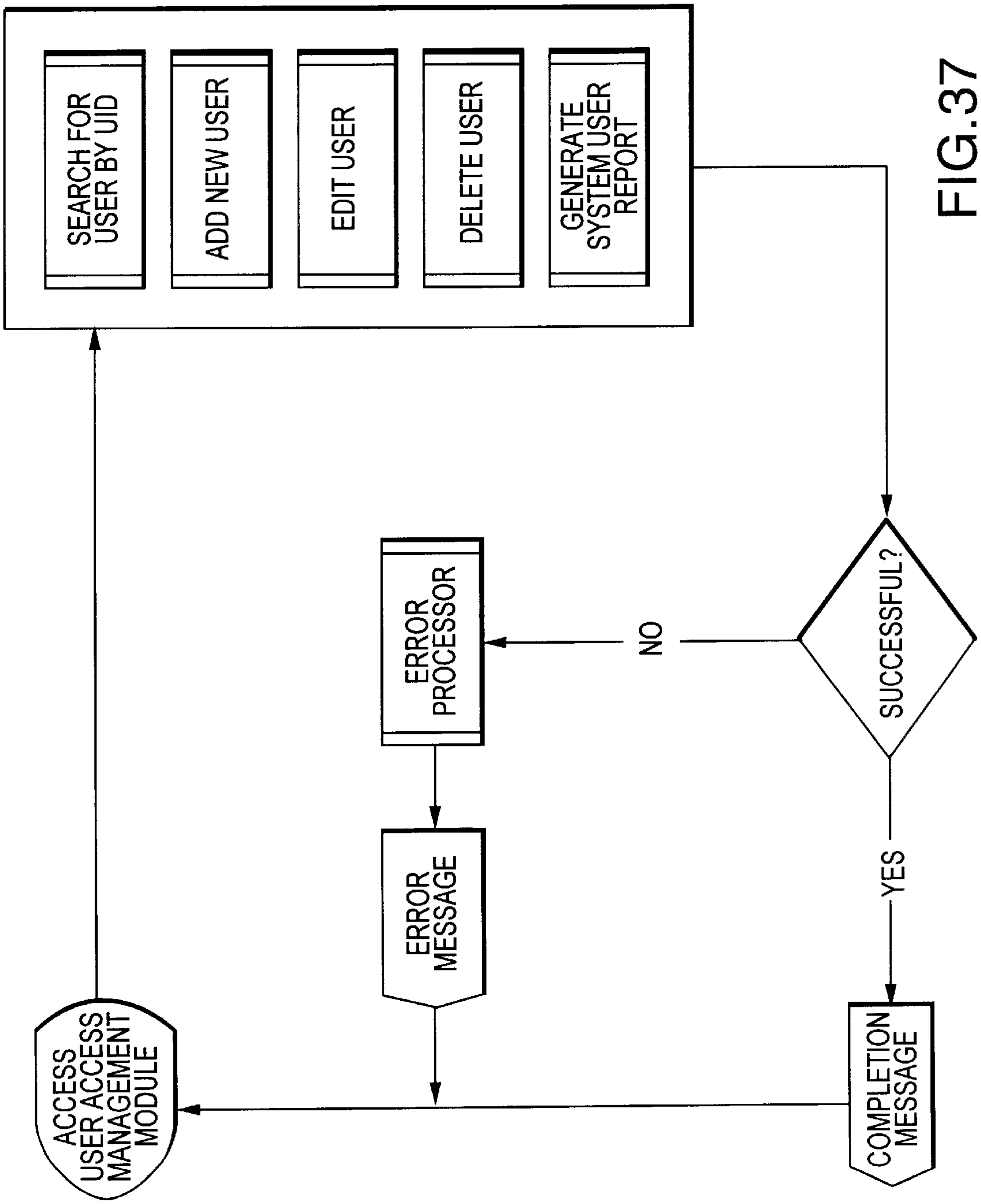
FIG. 37 discloses a flow chart that describes the operation of the user access management module.
Figure 38:
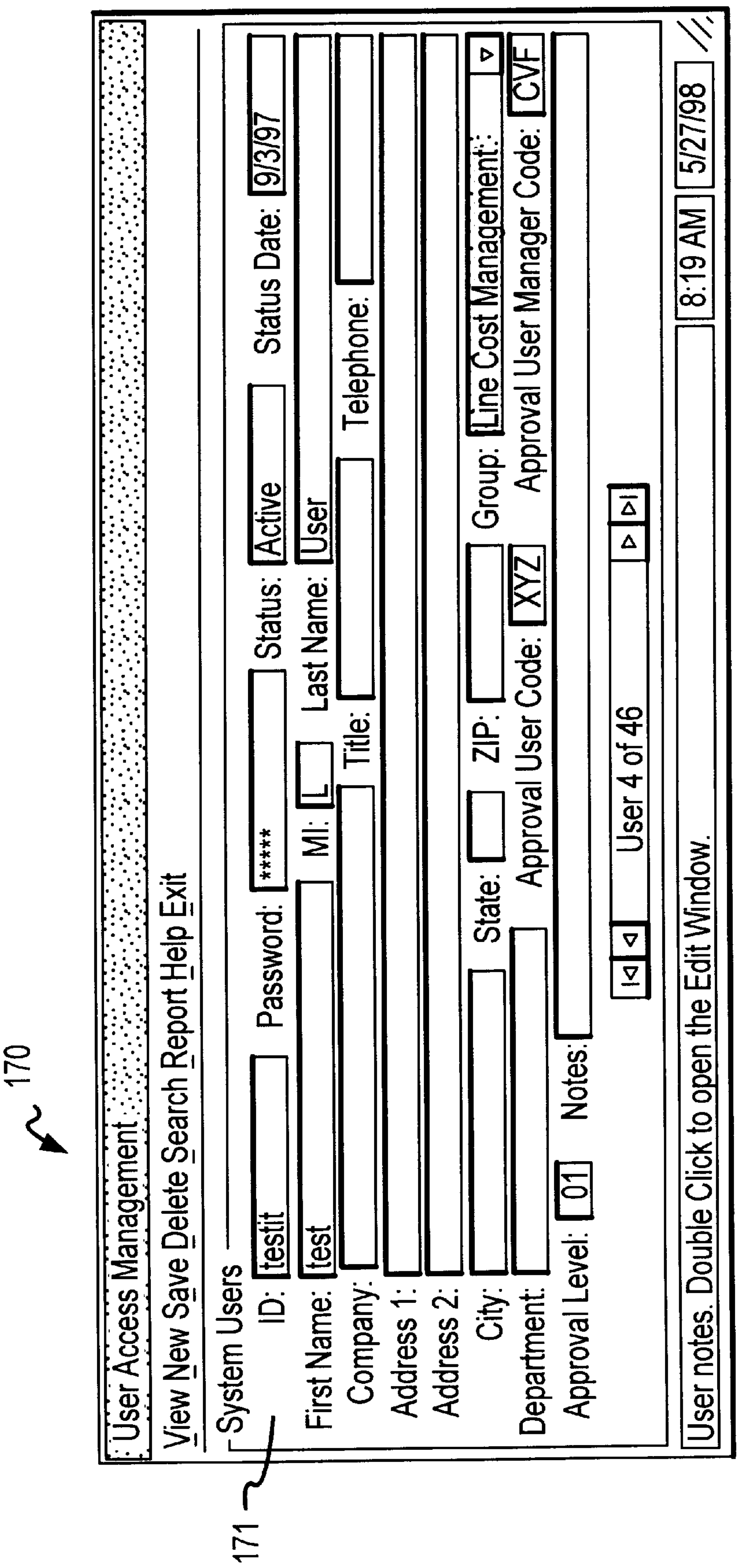
FIG. 38 discloses a screen that may be utilized by a system user to perform user access management.

Various users may have access to the system in order to perform various functions including data entry, general accounting, network planning, line cost management, marketing, product analysis, bill upload, data validation, invoice review and approval, and invoice payment. The information resources required and appropriate for each group of users may vary. The authority of certain users to authorize payment of bills may vary, as well. The user access management module provides the facility to authorize new users, change an existing user's status, terminate an existing user's access to the system, change a user's group affiliation on the system, and authorize or change the level of approval for bill payment for a user. The processes performed in the user access management module are illustrated in the flow chart of FIG. 37. FIG. 38 shows a screen display 170 that may be used by a system administrator to perform user access management functions. Through block 171 the system user may access and edit information contained in the databases. If any of the above functions is unsuccessful for whatever reason the error is logged and an error message is generated.

Figure 39:
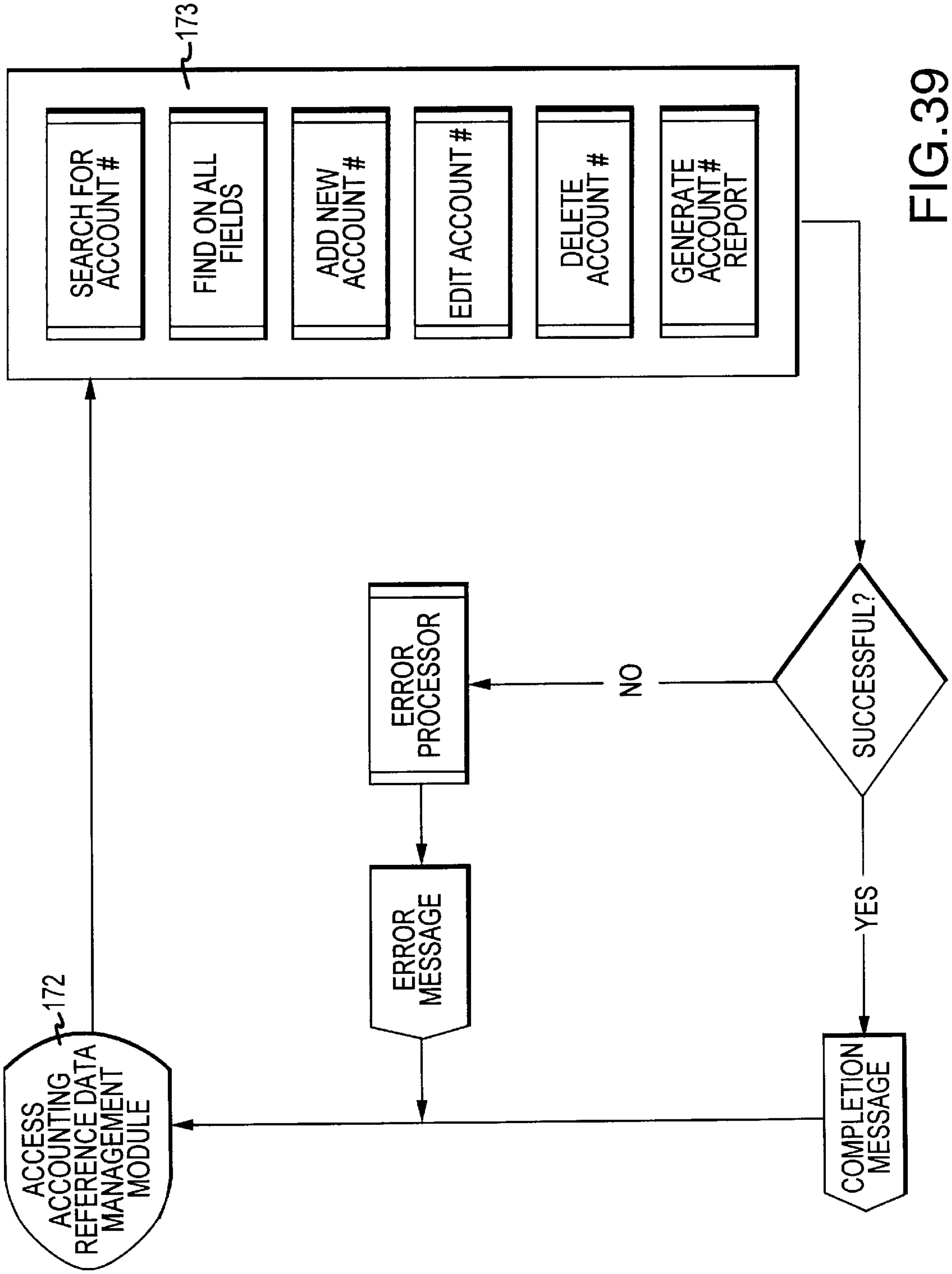
FIG. 39 discloses a flow chart that describes the operation of the accounting reference data management module.
Figure 40:
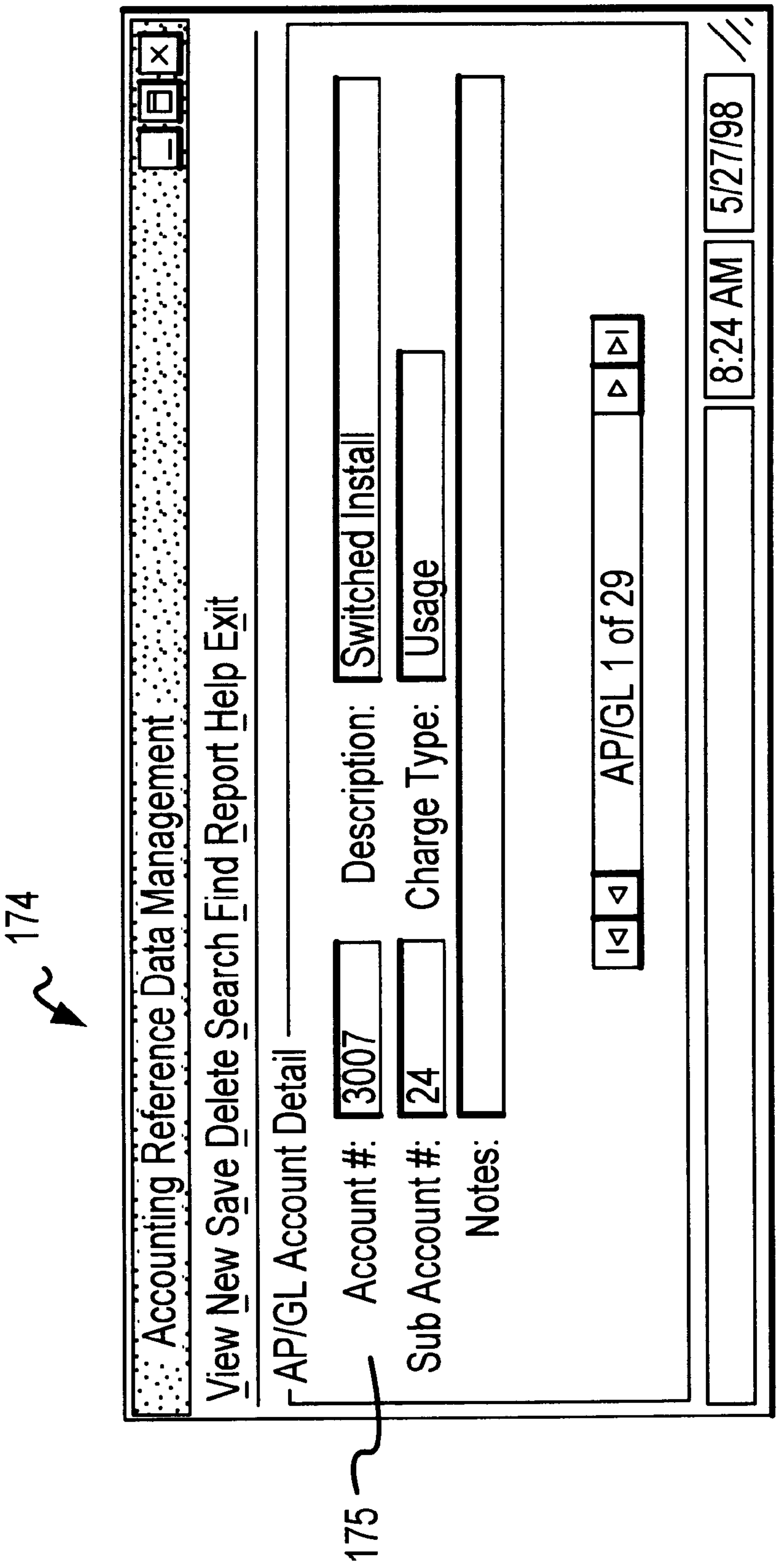
FIG. 40 discloses a screen that may be utilized by a system user to perform accounting reference data management.

All the charges paid through the system must be associated with accounting codes appropriate for the type of charge. The facility must exist, in the rapidly changing telecommunications community, to add and modify account codes appropriate for the charges received. The account reference data management module provides the mechanism to add, change, or delete account codes consistent with local accounting systems and practices, and associate those codes with specific charges. The processes performed in the accounting reference data management module are illustrated in the flow chart of FIG. 39. FIG. 40 shows a screen display 174 and in particular block 175 which may be used by a system administrator to perform accounting reference data management functions. If any of the above functions is unsuccessful for whatever reason the error is logged and an error message is generated.

The foregoing description of the present invention has been presented for purposes of illustration and description. Furthermore, the description is not intended to limit the invention to the form disclosed herein. Consequently, variations and modifications commensurate with the above teaching, and the skill or knowledge of the relevant art, are within the scope of the present invention. The embodiments described hereinabove are further intended to explain best modes known for practicing the invention and to enable others skilled in the art to utilize the invention in such or other embodiments and with various modifications required by the particular applications or uses of the present invention. It is intended that the claims be construed to include alternative embodiments to the extent permitted by the prior art.

What is claimed is:

1. A system for use in the handling of billed charges between different communication carrier service providers, comprising the steps of:

receiving, at a first communication carrier service provider, billed charges in a first digital file format from a second communication carrier service provider, wherein said billed charges include a plurality of entries and each of said entries includes a billed charge rate component;

automatically retrieving from a database, for each of said plurality of entries, a reference charge rate corresponding in type with said billed charge rate;

automatically comparing, for each of said plurality of entries, said billed charge rate with said corresponding reference charge rate to identify discrepancies therebetween.

2. A system as claimed in claim 1, further comprising the step of:

automatically identifying predetermined information for any of said plurality of billing entries that have identified discrepancies between said corresponding billed charge rate and said reference charge rate.

3. A system as claimed in claim 2, said automatically identifying step comprising:

displaying at least a portion of said predetermined information to a user at user interface.

4. A system as claimed in claim 3, wherein said predetermined information includes information relating to the identified discrepancy.

5. A system as claimed in claim 1, further comprising:

automatically identifying for payment at least a portion of said plurality of entries of said billing charges.

6. A system as claimed in claim 5, wherein the at least a portion of said plurality of entries are those entries which are without an identified discrepancy.

7. A system as claimed in claim 5, wherein the at least a portion of said plurality of entries is automatically identified for payment if the billing amount of the entries is less than a predetermined amount.

8. A system as claimed in claim 1, wherein said database comprises a plurality of different types of said reference charge rates.

9. A system as claimed in claim 8, wherein the different types of said reference charge rates includes: i) rates as established by contract between said first and second communication carrier service providers, and ii) rates as established by a third-party.

10. A system as recited in claim 1, further comprising:

automatically determining whether a given billing entry corresponding with an identified discrepancy should be automatically authorized for payment.

11. A system as claimed in claim 10, wherein each of said plurality of entries corresponds with data in said billed charges that includes a billed amount, and wherein said automatically determining step further comprises:

automatically comparing, for each of said entries, said corresponding billed amount with a predetermined unit amount, wherein said portion of billing entries comprises only those having billing amounts less than said predetermined amount are automatically authorized for payment.

12. A system as claimed in claim 1, further comprising the step of:

automatically converting said billed charges in said first digital file format to a second digital file format in accordance with preprogrammed instructions, said preprogrammed instructions being automatically selected in corresponding relation to identification information included in the billed charges received in said first digital file format from the second communication carrier service provider.

13. A system as claimed in claim 1, said receiving step comprising:

reading said billed charges from any of a plurality of types of digital storage means.

14. A system as claimed in claim 1, further comprising:

automatically generating a dispute report for a given billing entry with a corresponding identified discrepancy.

15. A system for processing billed charges between service providers comprising:

means, at a first service provider, for uploading the billed charges in a first format from a second service provider, wherein the billed charges includes a plurality of entries with a billed rate component;

database means which includes reference billing rate information; and validation means which receives the billed charges from said means for receiving billed charges and automatically compares the billed rate component of the plurality of entries with the reference billing rate information to identify discrepancies.

16. The system for processing billed charges between service providers of claim 15 wherein said means for uploading the billed charges includes means for converting the billed charges from the first format to a second format.

17. The system for processing billed charges between service providers of claim 16 wherein the second format is a relational database format.

18. The system for processing billed charges between service providers of claim 17 further including a user interface for displaying a selected information.

19. The system for processing billed charges between service providers of claim 18 wherein the user interface provides the capability to manually enter the billed charges and other bill related information.

20. The system for processing billed charges between service providers of claim 15 further including a dispute management means which generates a dispute report for any of the plurality of entries for which the validation means has identified a discrepancy.

21. The system for processing billed charges between service providers of claim 20 wherein the dispute management means further includes means to review, amend, and close dispute reports.

22. The system for processing billed charges between service providers of claim 15 further including means for review and approval of the billed charges.

23. The system for processing billed charges between service providers of claim 22 further including autopayment means which provides automatic payment of the billed charges when approved.

24. The system for processing billed charges between service providers of claim 22 further including means for requesting authorization of payment when the billed charges exceed a predetermined value.

25. The system for processing billed charges between service providers of claim 15 wherein the means for receiving the billed charges includes means for comparing the plurality of entries against information contained in the database to check for duplicate entries.

26. The system for processing billed charges between service providers of claim 15 wherein the reference billing rate information includes at least one of a group comprising: billing rates based on agreements between the first and second parties, and billing rates established by a third party.

27. The system for processing billed charges between service providers of claim 15 wherein the billed charges relate to the use of the second provider's telephony services by the first provider.

28. A system for processing billed charges from a vendor, comprising:

at least one graphical user interface comprising:

an upload module which uploads the billed charges from the vendor in a first format, wherein the billed charges include a plurality of entries with a billed rate component; and a validation module which receives the billed charges and automatically compares the billed rate component of the plurality of entries with reference billing rate information to identify discrepancies;

a display which displays information relating to the billed charges; and a database in connection with the at least one graphical user interface which provides the reference billing rate information.

29. The apparatus of claim 28 wherein the upload module includes means for converting the billed charges from the first format to the second format and storing the billed charges in the database.

30. The apparatus of claim 29 wherein the at least one graphical user interface is connected to the database over a data network.

31. The apparatus of claim 30 wherein the connection is a ODBC TCP/IP connection.

32. The apparatus of claim 31 wherein the upload module includes means for accessing the database and checking the billed charges for duplicate entries.

33. The apparatus of claim 28, wherein the graphical user interface further includes at least one processing module from a group comprising:

a dispute management module for generating dispute reports for any of the plurality of entries for which the validation module has identified a discrepancy;

a bill review and approval module which provides for review of the information relating to the billed charges, and status changes relating to payment of the billed charges; and a bill payment module which provides for automatic payment to the vendor of the billed charges which have been approved.

34. The apparatus of claim 33, wherein the graphical user interface further includes at least one processing module from a group comprising:

a standard reports module provides for display and output of the billed charges in a plurality of formats;

a manual data entry module which processes billing information manually entered into the at least on graphical user interface;

at least one vendor management module which maintains information specific to vendors in the database;

an account management module which maintains a master account table in the database;

a filed percent interstate usage management module which maintains information related to interstate usage rates in the database;

a contract management module which tracks and maintains a table of contracts between parties in the database;

a billed circuit inventory module which maintains an inventory of circuits in the database;

a data dictionary module which provides for organization, annotation, location, and retrieval of information in the database;

a user access management module which controls access to various portions of the system; and a system administration module provides for the adding, changing, and deleting of reference information in the database.

35. The apparatus of claim 28 wherein the database is relational in nature.

36. The apparatus of claim 28 wherein the at least one graphical user interface is a personal computer.

* * * * *